United States Patent
Griffith et al.

(10) Patent No.: US 11,156,433 B2
(45) Date of Patent: Oct. 26, 2021

(54) BRACE APPARATUS FOR STABILIZING A FIREARM

(71) Applicants: Benjamin Latham Griffith, Salt Lake City, UT (US); Arrius Lee Sorbonne, Salt Lake City, UT (US)

(72) Inventors: Benjamin Latham Griffith, Salt Lake City, UT (US); Arrius Lee Sorbonne, Salt Lake City, UT (US)

( * ) Notice: Subject to any disclaimer, the term of this patent is extended or adjusted under 35 U.S.C. 154(b) by 0 days.

(21) Appl. No.: 16/666,240

(22) Filed: Oct. 28, 2019

(65) Prior Publication Data
US 2020/0326151 A1 Oct. 15, 2020

Related U.S. Application Data

(60) Provisional application No. 62/751,117, filed on Oct. 26, 2018.

(51) Int. Cl.
| | |
|---|---|
| *F41C 23/12* | (2006.01) |
| *B23P 19/00* | (2006.01) |
| *F41C 23/04* | (2006.01) |
| *F24F 11/00* | (2018.01) |

(52) U.S. Cl.
CPC .............. *F41C 23/12* (2013.01); *B23P 19/00* (2013.01); *F41C 23/04* (2013.01); *F24F 11/0001* (2013.01)

(58) Field of Classification Search
CPC .......... F41C 23/04; F41C 23/12; F41C 23/10; F41C 23/14
See application file for complete search history.

(56) References Cited

U.S. PATENT DOCUMENTS

| | | | |
|---|---|---|---|
| 6,016,620 A | 1/2000 | Morgan | |
| 6,564,492 B2 * | 5/2003 | Weldle | F41C 23/14 42/73 |
| 8,061,072 B1 * | 11/2011 | Crose | F41C 23/04 42/73 |
| 8,677,669 B1 | 3/2014 | Vesligaj | |
| 9,310,159 B1 | 4/2016 | Lemoine | |
| 9,347,739 B2 * | 5/2016 | Gomirato | F41C 23/14 |
| 9,354,021 B2 | 5/2016 | Bosco | |
| 9,664,477 B1 * | 5/2017 | Reavis, III | F41C 23/04 |
| 2002/0059747 A1 * | 5/2002 | Weldle | F41C 23/14 42/72 |
| 2016/0010944 A1 * | 1/2016 | Downey | F41C 23/06 42/74 |
| 2017/0219311 A1 | 8/2017 | Reavis, III | |
| 2018/0224233 A1 | 8/2018 | Macy | |

* cited by examiner

*Primary Examiner* — Joshua E Freeman
(74) *Attorney, Agent, or Firm* — Morriss O'Bryant Compagni Cannon, PLLC

(57) ABSTRACT

A brace apparatus for use with a firearm provides a mounting housing and a brace which is automatically deployable from a first position where the brace is in closer proximity to the mounting housing to a second position where the brace is distanced from the mounting housing, the brace being positioned for resting against a part of the user's body during firing of the firearm.

18 Claims, 21 Drawing Sheets

BRACE APPARATUS FOR STABILIZING A FIREARM

CROSS-REFERENCE TO RELATED APPLICATION

This invention claims priority to U.S. Provisional Application No. 62/751,117 filed on Oct. 26, 2018, the entirety of which is incorporated by this reference.

BACKGROUND OF THE INVENTION

Technical Field

This invention relates to firearms and, in particular, relates to an automatically deployable brace apparatus for stabilizing the firearm against a user's body.

Background of the Disclosure

Accurate shooting of a firearm can be compromised as a result of the firearm being unstably held in a hand. The desire to stabilize the firearm relative to a person's body, relative to the user's arm, or relative to the user's shoulder or chest, has resulted in the development of various devices that are attachable to a firearm and are braced against a part of the user's body.

Examples of such devices for stabilizing a firearm include U.S. Pat. No. 6,016,620; U.S. Pat. No. 9,354,021; U.S. Application No. 2017/0219311 and U.S. Application No. 2018/0224233. Each of these representative devices is attachable to a firearm, such as a handgun, a rifle, or a shotgun.

Such devices have a number of drawbacks, however. One of the most significant drawbacks is the fact that the stabilizing devices provide a fixed, backwardly extending brace that adds to the overall length of the pistol, which makes the firearm unwieldy to use in tight quarters due to the large size, as well as prohibiting easy holstering, storing and concealment. The same difficulties are found with stabilizing apparatus that are designed for use with rifles, shotguns or other armaments, large or small. There has been a solution devised in some known devices, which is the ability to collapse for storage and extend for use. However, these devices have drawbacks of their own, primarily, the difficulty and slow speed of deploying the brace into the extended position, and secondarily, excessive size due to a centered brace design.

Another examples of a device for stabilizing a firearm includes U.S. Pat. No. 9,347,739. The device provides an adjustable buttstock for small arms weapons, but is more cumbersome to manufacture, less stable, not convenient to deploy and not adapted to also be used as an arm brace. The device has another drawbacks of the difficulty in setting the locking position and excessive size due to a centered brace design.

SUMMARY OF THE INVENTION

In a first aspect, embodiments are disclosed of a brace apparatus for a firearm, comprising a mounting housing having an attachment surface to engage a firearm, one or more elongated bodies slidingly engaged with the mounting housing, a brace connected to each of the elongated bodies, and a deployment device positioned between the mounting housing and the brace, the deployment device having a locking member positioned to engage at least one of said elongated bodies, wherein the deployment device operates to cause the brace to automatically move, relative to the mounting housing, from a first position to a second position when the locking member is deactivated.

In certain embodiments, the mounting housing is further comprised of two lateral housing sides, each housing side being oriented for positioning on either side of a firearm when in use.

In other certain embodiments, each housing side is structured with a channel, each channel being sized to receive one of said elongated bodies.

In yet another embodiment, each of said elongated bodies further comprises an elongated element, each elongated element having a first end secured to the brace and each elongated element having a second end positioned at a distance from the brace.

In some embodiments, each of said elongated bodies further comprises an elongated element in the shape of a cylinder.

In other embodiments, each of said elongated bodies further comprises an elongated element in the shape of a rectangular bar.

In still some embodiments, each of said elongated bodies further comprises an elongated element in the extruded in the shape of the letter "U".

In other embodiments, each of said elongated bodies further comprises an elongated element extruded in the shape of the letter "L".

In some embodiments, each of said elongated bodies further comprises an elongated element extruded in the shape of the letter "V".

In still another embodiment, the second end of each of the elongated elements is of greater dimension than the dimension of the first end of each of the elongated elements.

In some embodiments, the brace is a body biased to one lateral side, adapted for unobstructed access to the grip of the firearm when in the first position.

In some other embodiments, the brace is a downward body biased to one lateral side, adapted for resting against the arm of a user.

In still other embodiments, the brace is an L-shaped body adapted for resting against and under the arm of a user.

In other embodiments, the brace is an inverted L-shaped body adapted for resting against the arm of a user.

In some other embodiments, the brace is a C-shaped body adapted for resting against and encompassing the side, top, and bottom of the arm of a user.

In other embodiments, the brace is a shoulder stock, designed to be braced against the user's chest or shoulder.

In other embodiments, the brace is a cheek rest, designed to be braced against the user's cheek or face.

In other embodiments, the deployment device further comprises a spring element between the mounting housing and the brace.

In some embodiments, the spring element is attached to the mounting housing.

In other embodiments, the spring element is attached to the brace.

In still other embodiments, the spring element is inside the elongated bodies.

In some embodiments, the spring element encompasses the elongated bodies.

In other embodiments, the spring element is a mechanical spring.

In some embodiments, the spring element is a gas-filled compressible piston.

In still other embodiments, the spring element is composed of two opposing magnets that repel each other.

In some embodiments, the spring element is driven with an electric motor.

In some embodiments, the deployment device incorporates multiple spring elements.

In still other embodiments, the locking member of the deployment device is connected to an actuating member that is attached to the mounting housing.

In yet other embodiments, the actuating member is pivotally mounted to the mounting housing, and has a first end connected to the locking member and a second end oriented for contact by a user's finger.

In some embodiments, the locking member further comprises a pivoting bar member having opposing ends, each end of the pivoting bar member being structured to lockingly engage one of the elongated bodies when the brace is in the first position.

In certain embodiments, a protective guard is positioned on said mounting housing for the purpose of guarding against injury.

In a second aspect, a firearm part comprises a primary body, one or more elongated bodies slidingly engaged with the primary body, a brace connected to each of the elongated bodies, and a deployment device positioned between the primary body and the brace, the deployment device having a locking member positioned to engage at least one of said elongated bodies, wherein the brace apparatus is configured to automatically move the brace from a first position, where the brace is in closer proximity to the grip or stock, to a second position, where the brace is distanced from the grip or stock of the firearm, upon actuation of the deployment device.

In yet another embodiment, each of said elongated bodies further comprises an elongated element, each elongated element having a first end secured to the brace and each elongated element having a second end positioned at a distance from the brace.

In some embodiments, each of said elongated bodies further comprises an elongated element in the shape of a cylinder.

In other embodiments, each of said elongated bodies further comprises an elongated element in the shape of a rectangular bar.

In still some embodiments, each of said elongated bodies further comprises an elongated element in the extruded in the shape of the letter "U".

In other embodiments, each of said elongated bodies further comprises an elongated element extruded in the shape of the letter "L".

In some embodiments, each of said elongated bodies further comprises an elongated element extruded in the shape of the letter "V".

In still another embodiment, the second end of each of the elongated elements is of greater dimension than the dimension of the first end of each of the elongated elements.

In some embodiments, the brace is a body biased to one lateral side, adapted for unobstructed access to the grip of the firearm when in the first position.

In some other embodiments, the brace is a downward body biased to one lateral side, adapted for resting against the arm of a user.

In still other embodiments, the brace is an L-shaped body adapted for resting against and under the arm of a user.

In other embodiments, the brace is an inverted L-shaped body adapted for resting against the arm of a user.

In some other embodiments, the brace is a C-shaped body adapted for resting against and encompassing the side, top, and bottom of the arm of a user.

In other embodiments, the deployment device further comprises a spring element between the primary body and the brace.

In some embodiments, the spring element is attached to the primary body.

In other embodiments, the spring element is attached to the brace.

In still other embodiments, the spring element is inside the elongated bodies.

In some embodiments, the spring element encompasses the elongated bodies.

In other embodiments, the spring element is a mechanical spring.

In some embodiments, the spring element is a gas-filled compressible piston.

In still other embodiments, the spring element is composed of two opposing magnets that repel each other.

In some embodiments, the spring element is driven with an electric motor.

In some embodiments, the deployment device incorporates multiple spring elements.

In still other embodiments, the locking member of the deployment device is connected to an actuating member that is attached to the primary body.

In yet other embodiments, the actuating member is pivotally mounted to the primary body, and has a first end connected to the locking member and a second end oriented for contact by a user's finger.

In some embodiments, the locking member further comprises a pivoting bar member having opposing ends, each end of the pivoting bar member being structured to lockingly engage one of the elongated bodies when the brace is in the first position.

In certain embodiments, a protective guard is positioned on said primary body for the purpose of guarding against injury.

In a third aspect, a brace apparatus to steady the firearm against a user's body, comprises a mounting housing, one or more elongated bodies slidingly engaged with the mounting housing, a brace connected to each of the elongated bodies, and a deployment device positioned between the mounting housing and the brace, the deployment device having a locking member positioned to engaged at least one of said elongated bodies, wherein the brace apparatus is configured to automatically move the brace from a first position, where the brace is in closer proximity to the grip or stock, to a second position, where the brace is distanced from the grip or stock of the firearm, upon actuation of the deployment device.

In yet other embodiments, the locking member of the deployment device is connected to an actuating member that is attached to the mounting housing and is operable by compressing the actuating member.

In some embodiments, each of the elongated bodies is comprised of an elongated element that is movable relative to the mounting housing and each elongated element has a first end connected to the brace and each elongated element has a second end that is positioned at a distance from the brace.

In yet other embodiments, the second end of each of the elongated elements has a dimension that is greater than the dimension of the first end of the elongated member.

In some embodiments, the brace apparatus further includes a reinforcement spine positioned in the mounting housing providing facilitated engagement of the mounting housing relative to the firearm.

In some embodiments, the brace is a body biased to one lateral side, adapted for unobstructed access to the grip of the firearm when in the first position.

In some other embodiments, the brace is a downward body biased to one lateral side, adapted for bracing against the user's shoulder or chest in the second position, and unobstructed access to the grip of the firearm when in the first position.

In still other embodiments, the brace is an L-shaped body adapted for bracing against the user's shoulder or chest in the second position, and unobstructed access to the grip of the firearm when in the first position.

In other embodiments, the brace is an inverted L-shaped body adapted for bracing against the user's shoulder or chest in the second position, and unobstructed access to the grip of the firearm when in the first position.

In some other embodiments, the brace is a C-shaped body adapted for bracing against the user's shoulder or chest in the second position, and unobstructed access to the grip of the firearm when in the first position.

In a fourth aspect, a firearm part comprises a primary body, one or more elongated bodies slidingly engaged with the primary body, a brace connected to each of the elongated bodies, and a deployment device positioned between the primary body and the brace, the deployment device having a locking member positioned to engage at least one of said elongated bodies, wherein the brace apparatus is configured to automatically move the brace from a first position, where the brace is in closer proximity to the grip or stock, to a second position, where the brace is distanced from the grip or stock of the firearm, upon actuation of the deployment device.

In yet other embodiments, the locking member of the deployment device is connected to an actuating member that is attached to the mounting housing and is operable by compressing the actuating member.

In some embodiments, each of the elongated bodies is comprised of an elongated element that is movable relative to the mounting housing and each elongated element has a first end connected to the brace and each elongated element has a second end that is positioned at a distance from the brace.

In yet other embodiments, the second end of each of the elongated elements has a dimension that is greater than the dimension of the first end of the elongated member.

In some embodiments, the brace apparatus further includes a reinforcement spine positioned in the mounting housing providing facilitated engagement of the mounting housing relative to the firearm.

In some embodiments, the brace is a body biased to one lateral side, adapted for bracing against the user's shoulder or chest in the second position, and unobstructed access to the grip of the firearm when in the first position.

In some other embodiments, the brace is a downward body biased to one lateral side, adapted for bracing against the user's shoulder or chest in the second position, and unobstructed access to the grip of the firearm when in the first position.

In still other embodiments, the brace is an L-shaped body adapted for bracing against the user's shoulder or chest in the second position, and unobstructed access to the grip of the firearm when in the first position.

In other embodiments, the brace is an inverted L-shaped body adapted for bracing against the user's shoulder or chest in the second position, and unobstructed access to the grip of the firearm when in the first position.

In some other embodiments, the brace is a C-shaped body adapted for bracing against the user's shoulder or chest in the second position, and unobstructed access to the grip of the firearm when in the first position.

In still other embodiments, a spare magazine holder is attached to the end(s) of the elongated bodies.

In other embodiments the brace has a spare magazine holder incorporated into the body.

In still other embodiments, an optic mount is incorporated into the mounting housing.

Other aspects, features, and advantages will become apparent from the following detailed description when taken in conjunction with the accompanying drawings, which are a part of this disclosure and which illustrate, by way of example, principles of the inventions disclosed.

BRIEF DESCRIPTION OF THE DRAWINGS

The accompanying drawings facilitate an understanding of the various embodiments.

DETAILED DESCRIPTION OF THE INVENTION

Figure 1:
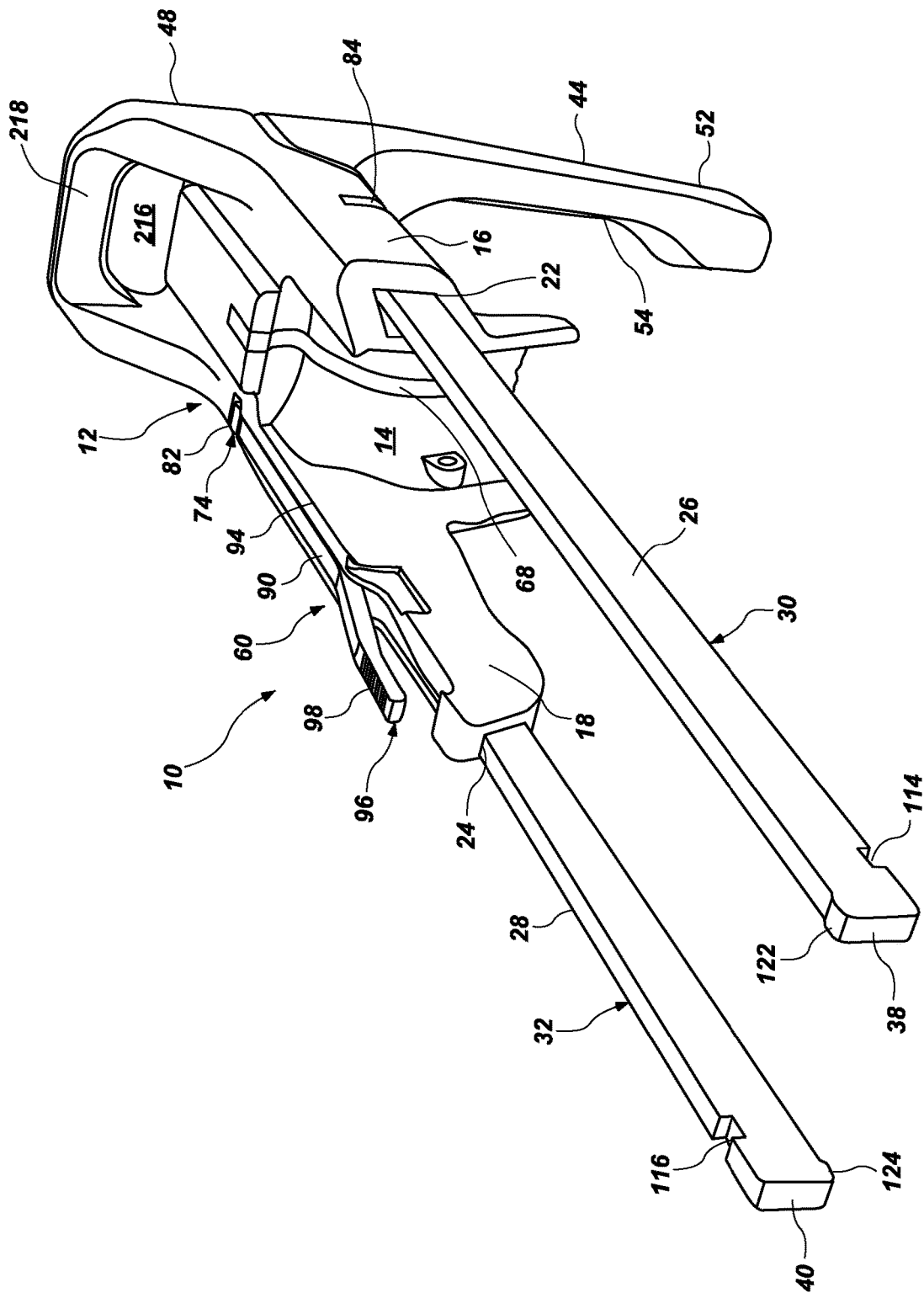
FIG. 1 is a perspective view of the brace apparatus in accordance with this disclosure, viewed from a portion of the apparatus that attaches to a firearm.
Figure 16:
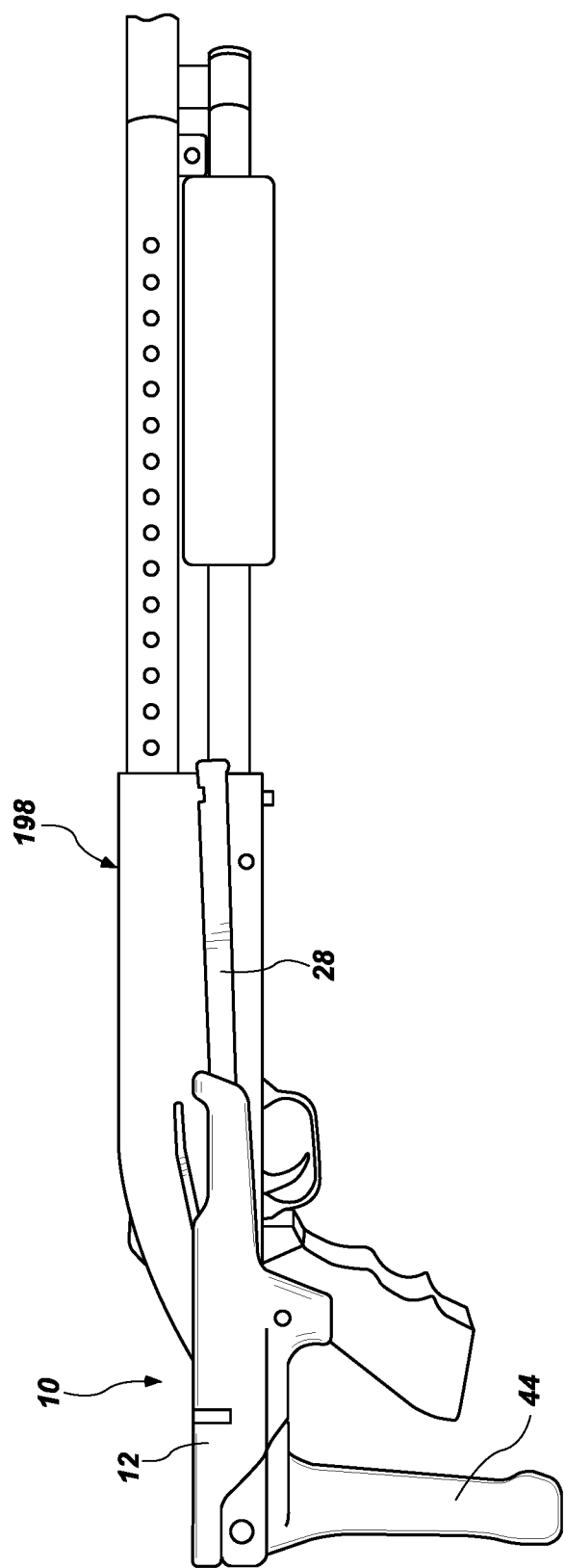
FIG. 16 depicts a brace apparatus in accordance with this disclosure that is part of a shotgun, the brace apparatus being shown in a first position.
Figure 17:
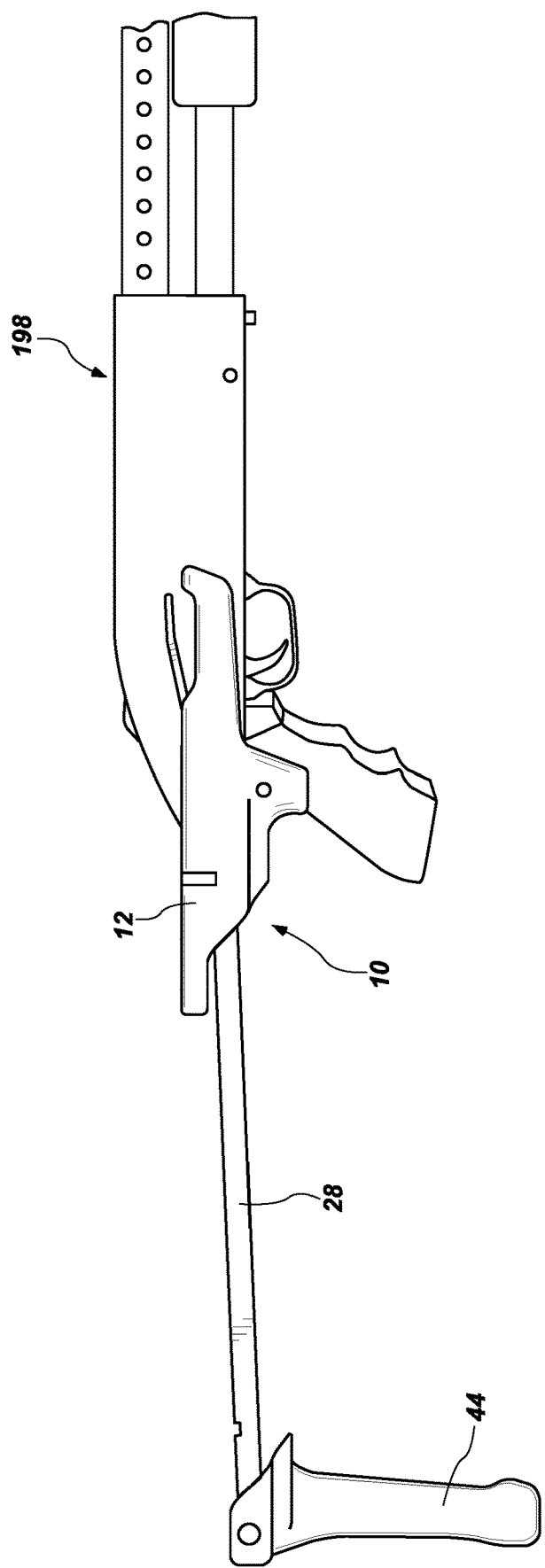
FIG. 17 depicts a brace apparatus in accordance with this disclosure that is part of a shotgun, the brace apparatus being shown in a second position.

FIG. 1 illustrates the brace apparatus 10 for a firearm in accordance with this disclosure. As used herein, the term "firearm" is given its full meaning as defined in accordance with 18 U.S.C. § 921(3), but also includes antique firearms. The brace apparatus 10 of this disclosure is described and illustrated herein with respect to its use with a hand gun or pistol, but the brace apparatus is adaptable to any other firearm, such as a shotgun, as depicted in FIGS. 16 and 17. The brace apparatus is adaptable to be attached or built into a pistol chassis system.

The brace apparatus 10 generally comprises a mounting housing 12 having an attachment surface 14 to engage a firearm. The mounting housing 12 has two lateral housing sides 16, 18 that, in use, are positioned along either side of a firearm, as described more fully below.

Each of the two lateral housing sides 16, 18 is formed with a channel 22, 24 through which one of two elongated bodies 26, 28 is slidingly received. The two elongated bodies 26, 28 are spaced apart from each other by virtue of each being connected to one of the two lateral housing sides 16, 18. Each of the elongated bodies 26, 28 are comprised of an elongated element 30, 32, and each elongated element 30, 32 has a first end 34, 36 (FIG. 2) and a second end 38, 40, which is located at a distance from the first end 34, 36.

Figure 2:
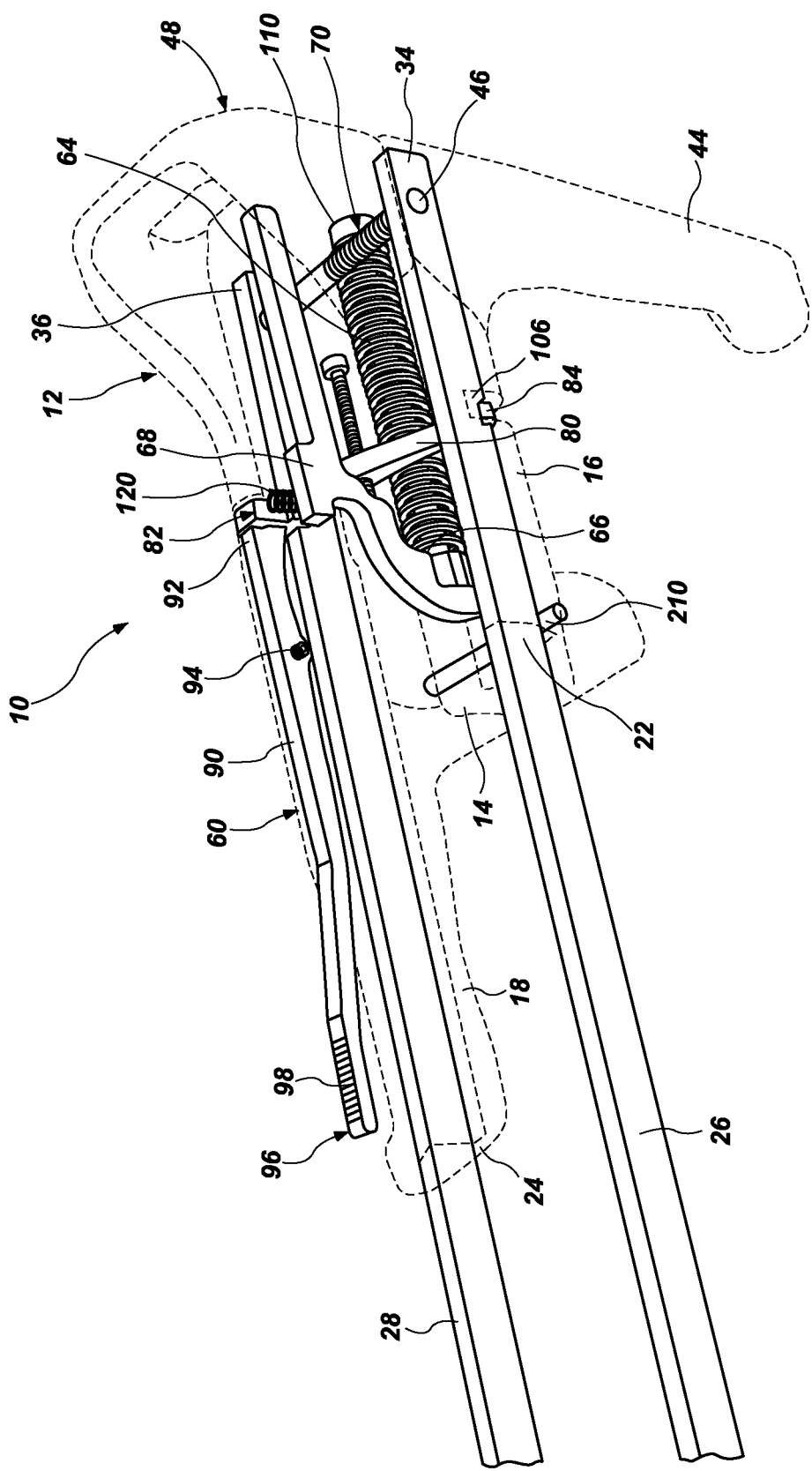
FIG. 2 is an enlarged partial perspective view of the brace apparatus, with the mounting housing shown in phantom to better show deployment mechanism.

The brace apparatus 10 further includes a brace 44 that, as best seen in FIG. 2, is attached to each of the elongated bodies 26, 28 at the first end 34, 36 of each elongated element 30, 32. As seen in FIG. 2, a pin 46 extends through each of the first ends 34, 36 of the elongated bodies 26, 28 and through the brace 44. The brace 44 extends downwardly in orientation from the rear portion 48 of the mounting housing 12 and is movable relative to the mounting housing 12. The brace 44 may be of any configuration, but is shown in a particularly suitable configuration which has an asymmetrical presentation. That is, the brace 44, which is better seen in FIG. 8, has a horizontally extending portion 50, through which the pin 46 extends to connect the brace 44 to the elongated bodies 26, 28, and a downwardly extending portion 52 having an inner surface 54 for engaging the hand or arm of a user. Notably, the brace of the brace apparatus in accordance with this disclosure may be configured as a gun stock or rifle stock which, in the traditional sense, is held against the user's shoulder. Additionally, the brace may be configured for being positioned against or near the user's cheek or other part of the face, neck, shoulder or chest.

Figure 9:
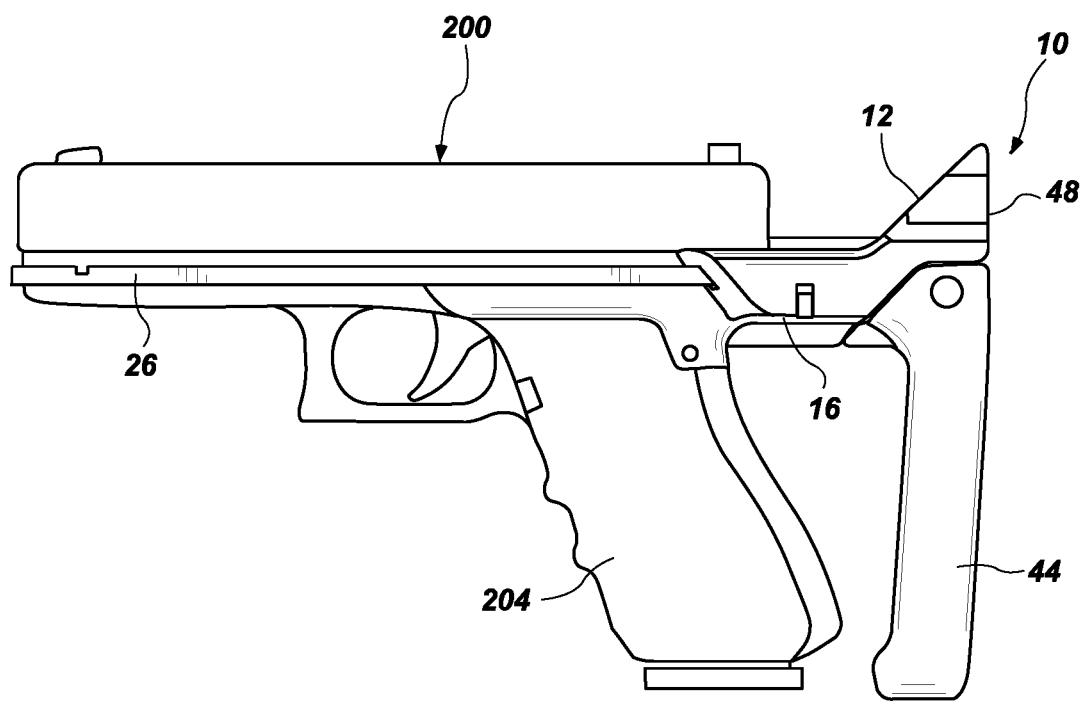
FIG. 9 is a side view in elevation of the brace apparatus secured to a hand gun and being in a first position.
Figure 10:
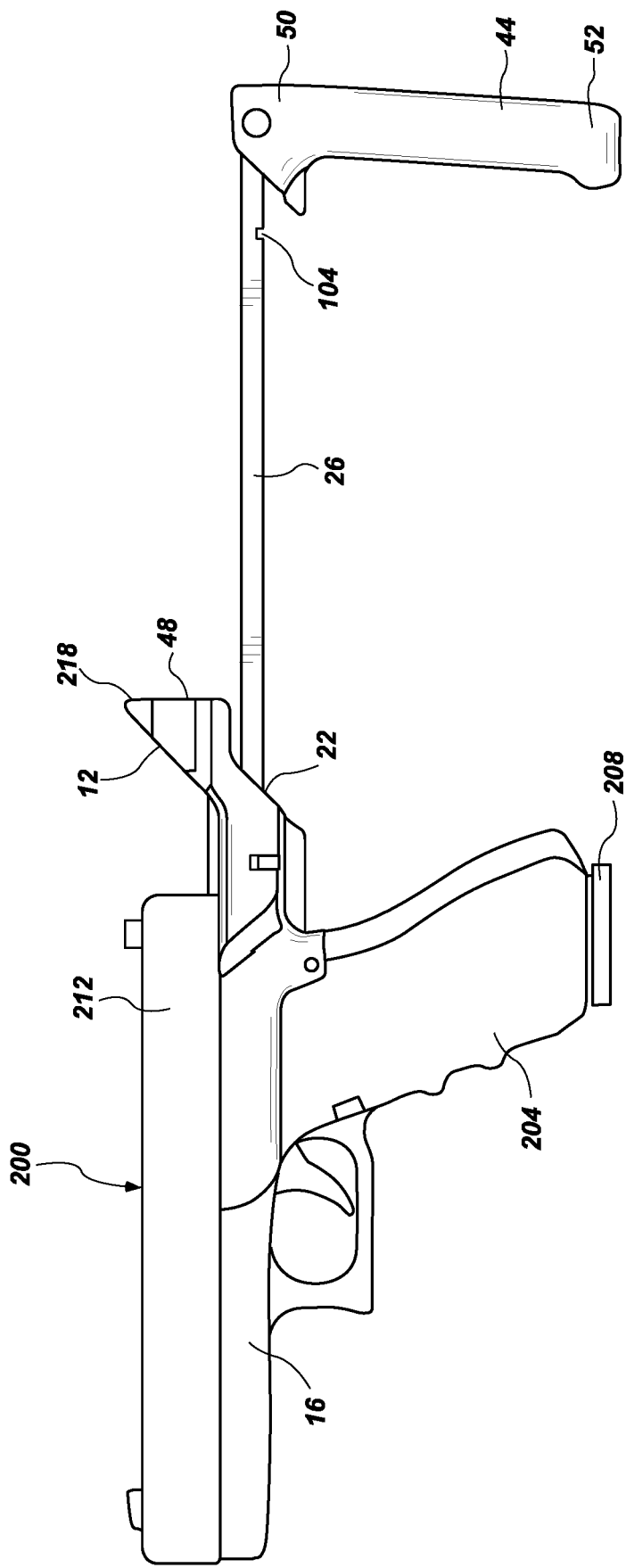
FIG. 10 is a side view in elevation of the brace apparatus secured to a hand gun and being in a second, or deployed, position.

The brace apparatus 10 further includes a deployment device 60, which operates to move the brace 44, relative to the mounting housing 12, from a first position where the brace 44 is located in proximity to the mounting housing 12, as shown in FIGS. 1, 2 and 9, to a second position where the brace 44 is positioned at a distance away from the mounting housing 12, as shown in FIG. 10, which is a deployed state. The elements of the deployment device 60 are most clearly shown in FIG. 2 and FIG. 3. The deployment device 60 is positioned between the mounting housing 12 and the brace 44. In the embodiment shown in FIGS. 2 and 3, the deployment apparatus 60 includes a compression spring 64 that is connected at one end 66 to the mounting housing 12 and is secured the mounting housing 16, 18. The compression spring 64 has a free end 70 which, when the brace 44 is in the first position, is in registration with the brace 44, the compression spring 64 being biased between the reinforcement spine 68 and the brace 44. The deployment device and locking The deployment device 60 further includes a locking member 74 that may be configured in any manner that facilitates the release of the compression spring 64 to deploy the brace 44, thereby moving the brace 44 to the second position, or deployed state. As one example, the locking member 74 may include a pivoting bar 80, the pivoting bar 80 having a first end 82 that engages with one of the elongated bodies 26 on one side thereof, and a second end 84 that engages with the other of the elongated bodies 28 on an opposite side thereof to secure the elongated bodies 26, 28 in a forward position where the brace 44 is maintained in the first position. The pivoting bar 80 is caused to pivot by movement of an actuating member 90 that is connected at a first end 92 to the pivoting bar 80. The actuating member 90 is, in turn, pivotally connected by a pivot pin 94 to one of the lateral housing sides 18. The actuating member 90 has at a second end 96 positioned opposite from the first end 92, and the second end 96 provides a contact point 98 for receiving the finger of a user in activating the actuating member 90.

Figure 3:
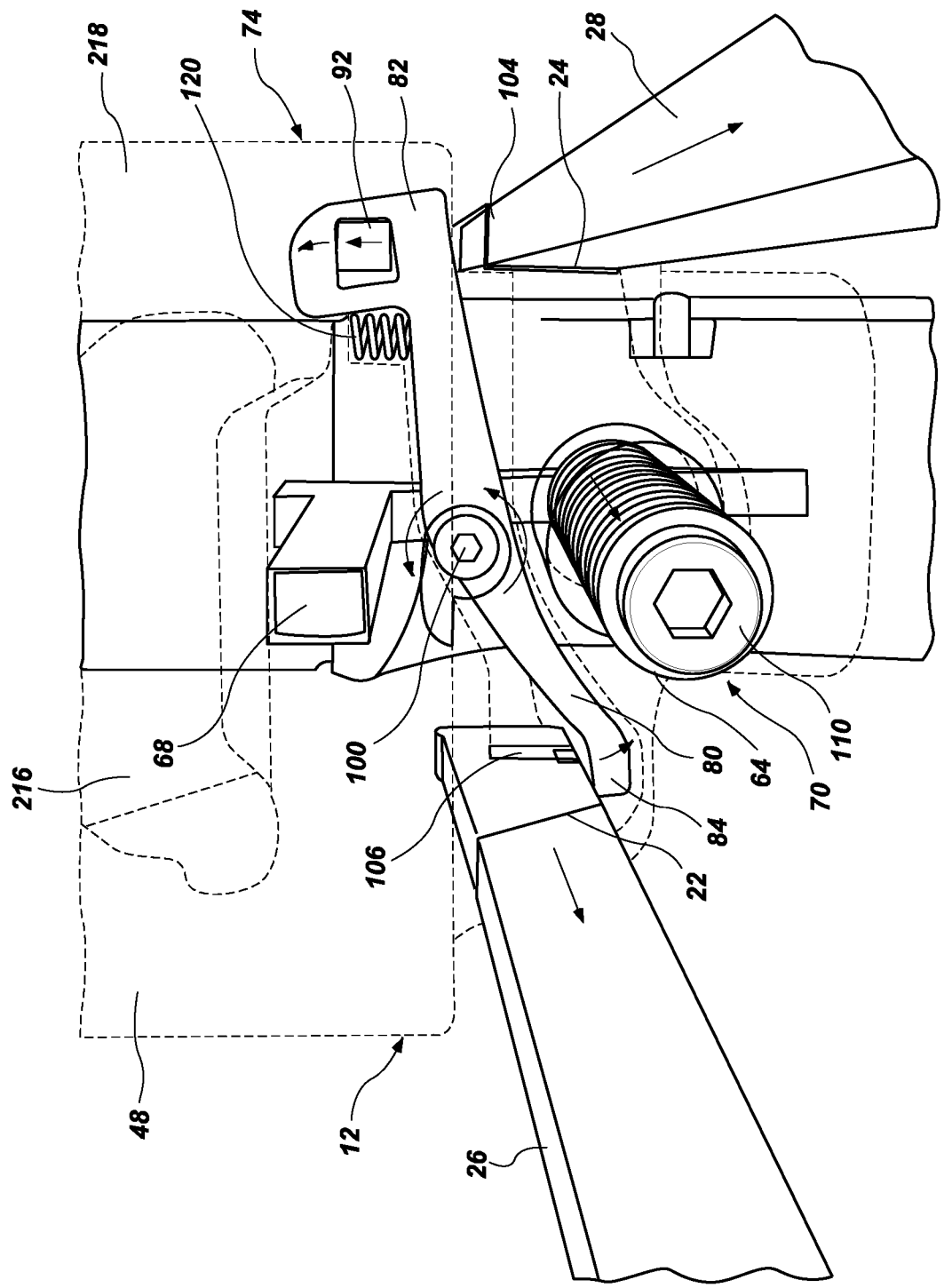
FIG. 3 is an enlarged view of the deployment mechanism and locking member, the mounting housing being shown in phantom.

The action of the locking member 74 can further be seen in FIG. 3, where the mounting housing 12 is shown in phantom for ease of illustration. When the actuating member 90 is pressed at the contact point 98, the first end 9 of the actuating member 90, which is connected to the first end 82 of the pivoting bar 80, causes the first end 82 of the pivoting bar 80 to move upwardly and out of a slot 104 formed in the elongated body 28 near the first end 36 of the elongated body 28. Simultaneously, the rotation of the pivoting bar 80 causes the second end 84 of the pivoting bar 80 to move downwardly, thereby causing the second end 84 of the pivoting bar 80 to disengage from a slot 106 formed in the other opposing elongated body 26 near the first end 38 of the elongated body 26. That is, the pivoting bar 80 has a first end 82 positioned over the elongate body 28 configured to engage with a notch or slot 104 in a top surface of the elongate body 28 and has a second end 84 positioned under the elongate body 26 configured to engage with a notch or slot 106 in a bottom surface of the elongate body 26. With the elongated bodies 26, 28 being freed from contact with the pivoting bar, which locks the brace 44 in registration with the end 70 of the compression spring 64, the compression spring 64 expands, causing the elongated bodies 26, 28 to slide backwardly away from the compression spring 64, thereby moving the brace 44 away and at a distance from the mounting housing 12 to the second position. It can be seen in FIG. 4 that an adjustment member 110 may be provided to allow for adjustment of the compression spring 64. That is, the coil-type compression spring 64 is disposed over the adjustment member 110 which comprises an elongate rod having a threaded distal end that engages a threaded nut disposed within the mounting housing and a head that can be rotated relative to the nut to increase or decrease the spring tension in the compression spring 64 as desired. Thus, if the spring 64 loses its spring force over time, the adjustment member 110 can be tightened to increase the spring force.

Referring again to FIG. 1, similar in configuration to the notch 106, it can be seen that the elongated body 26 has a second notch 114 formed at the second end 38 thereof, the opening of which is oriented downwardly. Also, similar in configuration to the notch 104, the elongated body 28 has a second notch 116 formed near the second end 40 of thereof, the opening of which is oriented upwardly. Consequently, when the pivoting bar 80 is caused to rotate by the actuating member 90, and the elongated bodies 26, 28 are unencumbered from the pivoting bar 80, the elongated bodies 26, 28 will slide through their respective channels 22, 24 in a backward direction until the pivoting bar 80, which is caused to rotate back into a locking position by a spring 120, then encounters the notches 114, 116 formed at the respective ends of the elongated bodies. In a simultaneous action, the second end 84 of the pivoting bar 80 engages with notch 114 and the first end 82 of the pivoting bar 80 engages with the notch 116 of the other elongated body 28, thereby securely locking the elongated bodies 26, 28 and the brace 44 into the second position.

Figure 4:
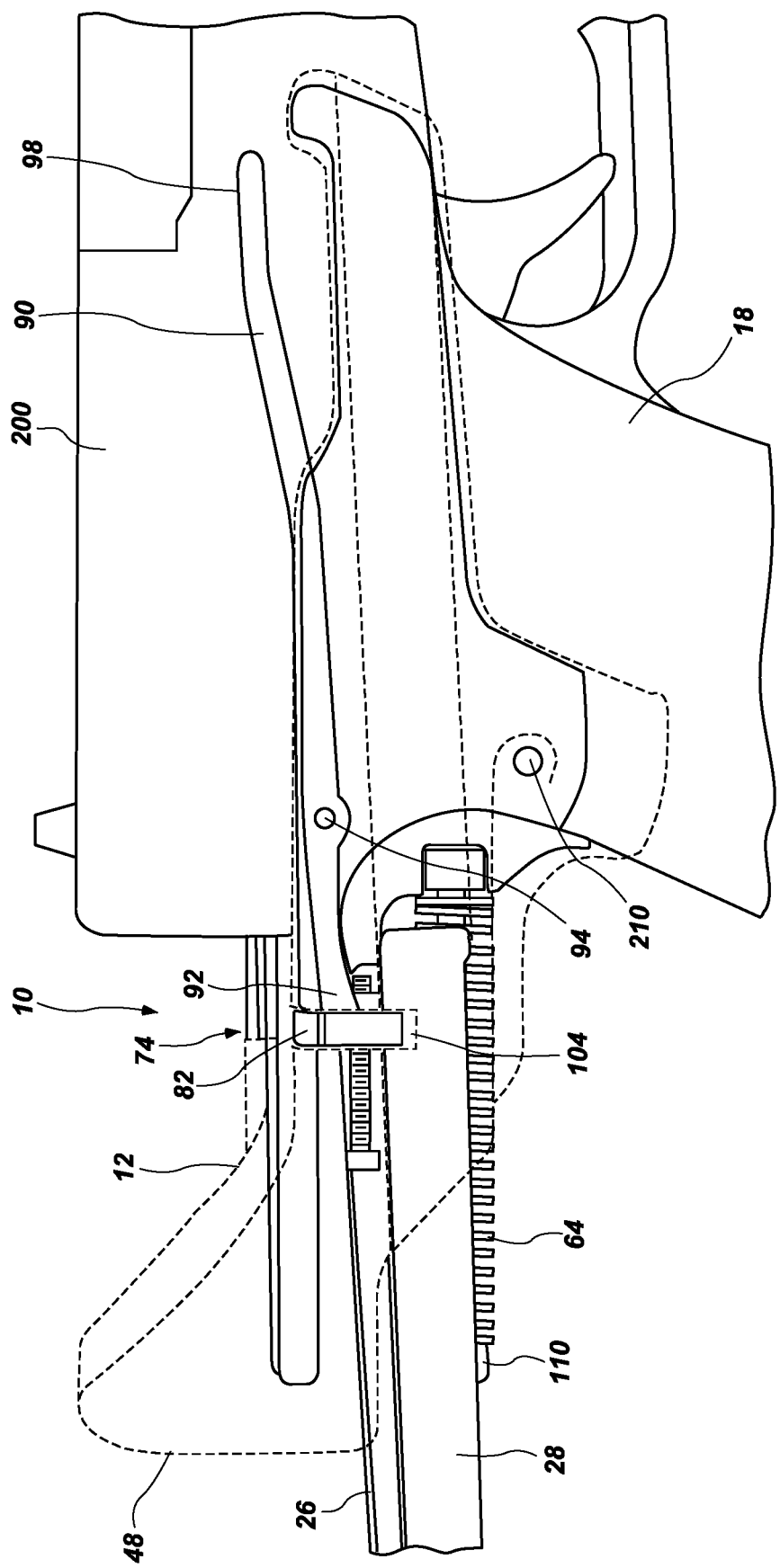
FIG. 4 is an enlarged side view in elevation of the brace apparatus in accordance with this disclosure, the mounting housing being shown in phantom to better illustrate the locking mechanism in a locked state.
Figure 5:
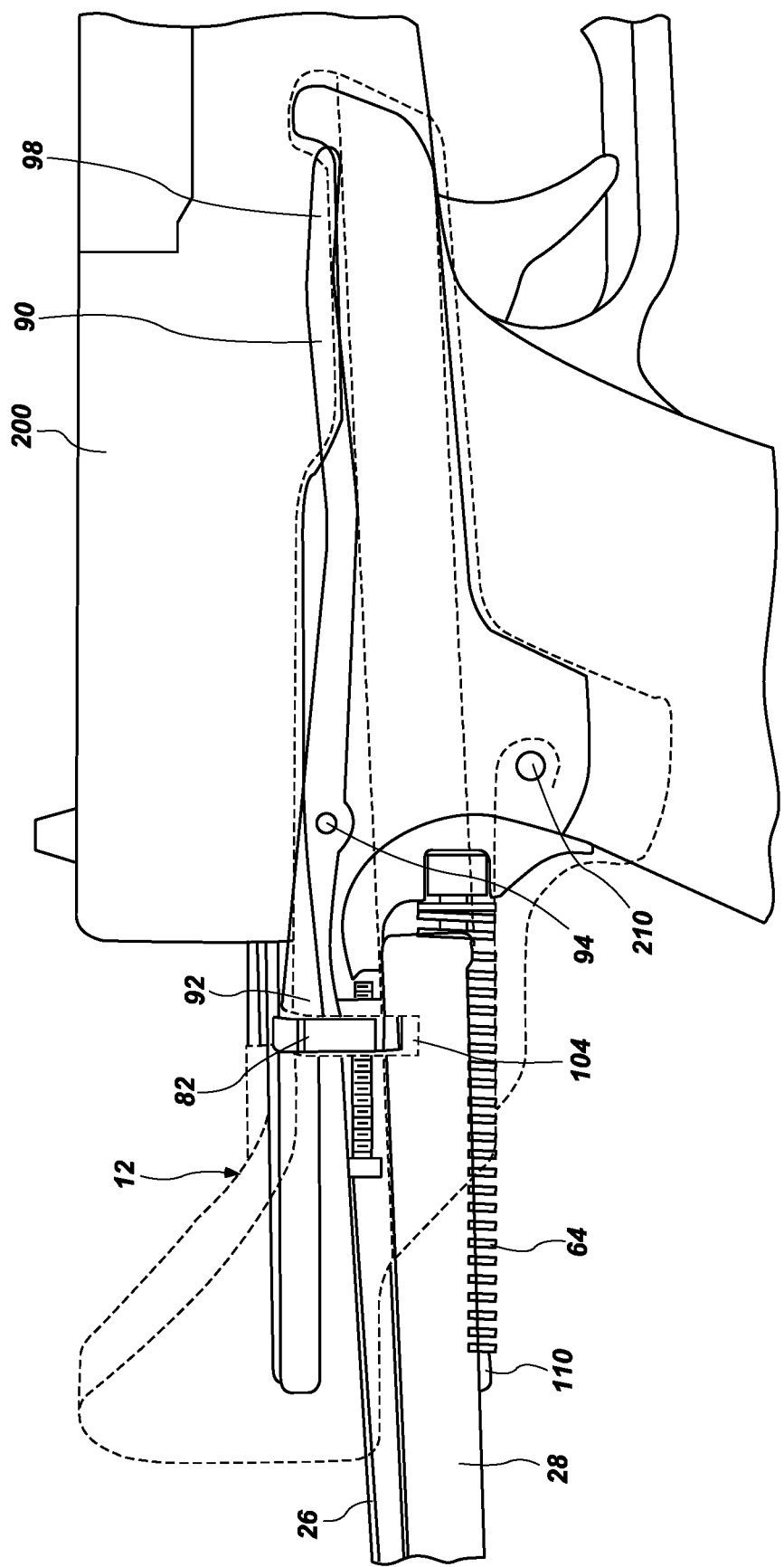
FIG. 5 is an enlarged side view in elevation of the brace apparatus in accordance with this disclosure, the mounting housing being shown in phantom to better illustrate the locking mechanism in an unlocked state.

FIG. 4 illustrates the position of the locking member 74 and the pivoting bar 80 when the brace (not shown) is in the second position, with the elongated bodies 26, 28 being deployed rearward. When the brace 44 is to be brought back to the first position, the actuating member is again depressed at the contact point 98, as shown in FIG. 5, which rotates the first end 82 and second end 84 of the pivoting bar 80 out of registration with notches 116 and 114, respectively, and the elongated bodies can be urged to slide through their respective channels 22, 24 until the spring force of spring 120 causes the first end 82 and second end 84 of the pivoting bar 80 to register into notches 104 and 106, respectively, of the elongated bodies 28, 26, which again locks the elongated bodies 26, 28 and brace 44 into the first position.

Figure 6:
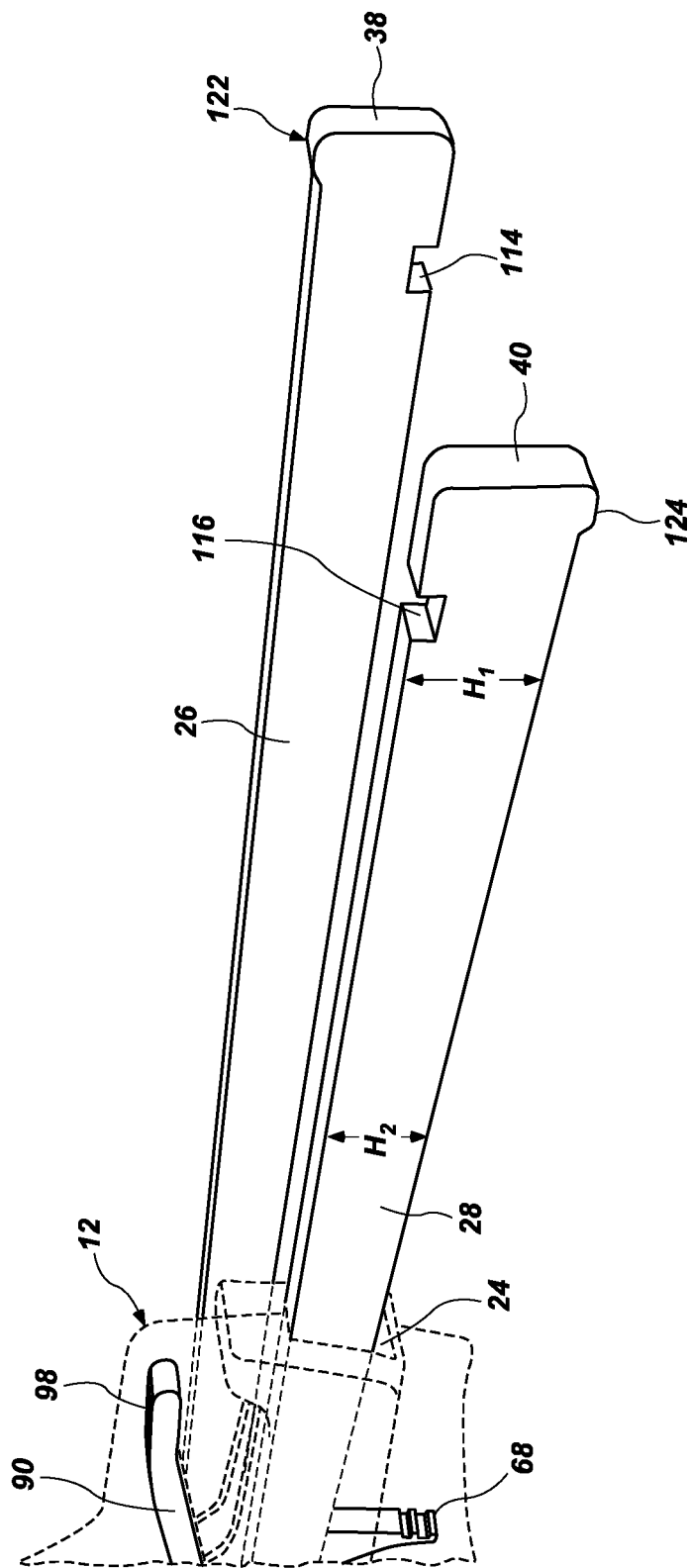
FIG. 6 is an enlarged perspective view of the elongated bodies of the brace apparatus in accordance with this disclosure.

FIG. 6 illustrates further features of the elongated bodies 26, 28. First, it can be seen that each of the elongated bodies 26, 28 is configured such that the dimension of each elongated body 26, 28 is greater near the second end 38, 40 of the elongated body in comparison to the dimension of the elongated bodies 26, 28 at a distance from the second ends 38, 40 of the elongated bodies 26, 28. The variation in dimension, may be carried out by different means or configurations of the elongated elements 30, 32. By way of example, as shown in FIG. 6, the height H1 of the elongated body 26, 28 nearer the second end 38, 40 may be greater than the height H2 of the elongated body 26, 28 at a distance from the second end 38, 40 of the elongated body 26, 28. As a consequence of the height variation, the second end 38, 40 of each elongated body 26, 28, as it slides backwardly through its respective channel 22, 24 provides a closer tolerance between the second end 38, 40 of the elongated body 26, 28 and the respective channel 22, 24 to provide a snug fit. That is, the end portions 38 and 40 are tapered along their lengths to gradually increase in dimension. This increase in height is a result of the lower surfaces of the elongated bodies 26 and 28 becoming nonparallel to the top surfaces of the elongate bodies 26 and 28 and thus becoming slightly wider. Similarly, the channels 22 and 24 may be similarly tapered along their length (as illustrated by the small gap between the channel 24 and the bottom edge of the elongate member 28) to substantially match the shape and size of the tapered ends of the elongated bodies 26 and 28, respectively. As a result, as the brace 44 is deployed from the first position to the second position, and as the brace 44 reaches the second position, the slight interference fit between the elongate bodies 26 and 28 at their second ends and the respective channels 22 and 24 causes the movement of the brace 44 and thus the elongate bodies 26 and 28 to slow as they reach the fully extended second position. This prevents the brace 44 from bouncing back toward the pistol 200 when the brace is fully deployed but before the pivoting bar 80 engages with the notches 104 and 106. Additionally, even if the actuating member 60 is not released when the brace 44 is deployed to the second position to lock the brace 44 in the second position, the friction fit between the elongate bodies 26 and 28 to the channels 22 and 24 holds the elongate bodies 26 and 28 in place relative to the mounting housing 12 and thus prevents the brace 44 from falling back toward the pistol grip, even if held in a vertical orientation where gravity would cause the brace to fall toward the pistol, until the actuating member 60 is released to allow the pivoting bar 80 to engage with the notches 104 and 106 in the elongate bodies 26 and 28. The configuration, therefore, provides a more stable bracing of the firearm via the brace apparatus 10.

Further, as seen in FIG. 6, the terminal ends of each second end 38, 40 of the elongated bodies 26, 28 may be formed with an extending boss 122, 124 that engages the respective channel 22, 24 opening to ensure that the elongated bodies 26, 28 do not slip through the channel 22, 24, and to provide a snug fit when in the second position.

Figure 7:
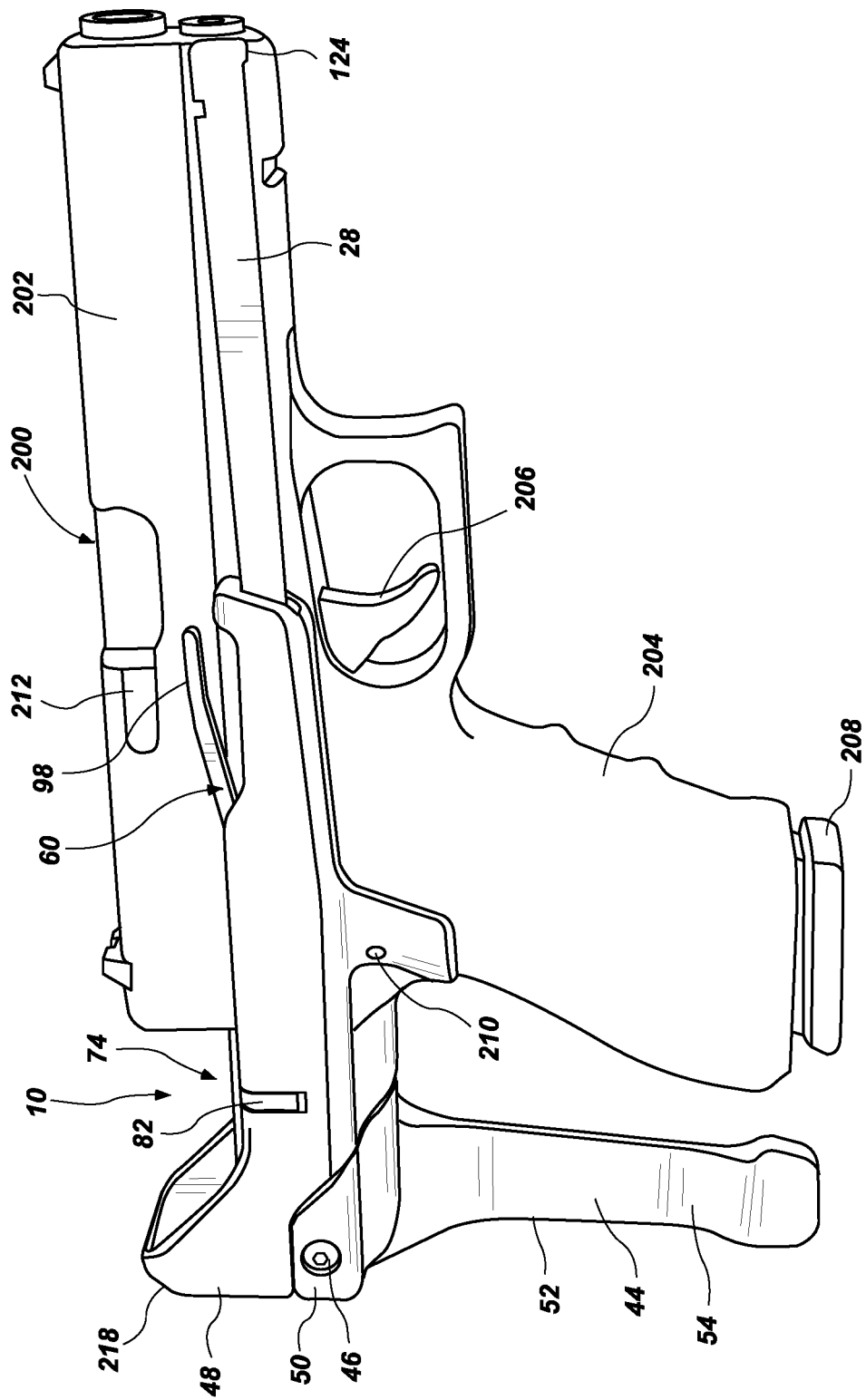
FIG. 7 is a perspective view of the brace apparatus in accordance with this disclosure as attached to a hand gun and being in a first, undeployed position.
Figure 18:
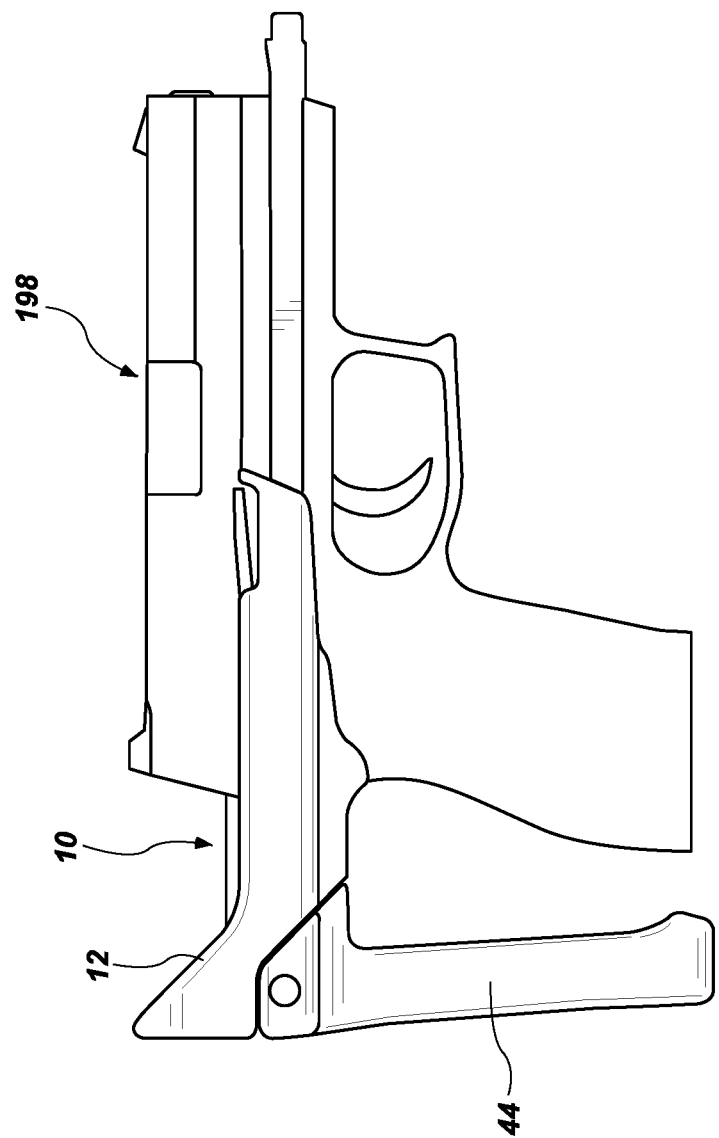
FIG. 18 depicts a brace apparatus in accordance with this disclosure which is integrally formed as part of the manufacture of a firearm part, depicted as a hand gun, the brace apparatus being shown in a first position.
Figure 19:
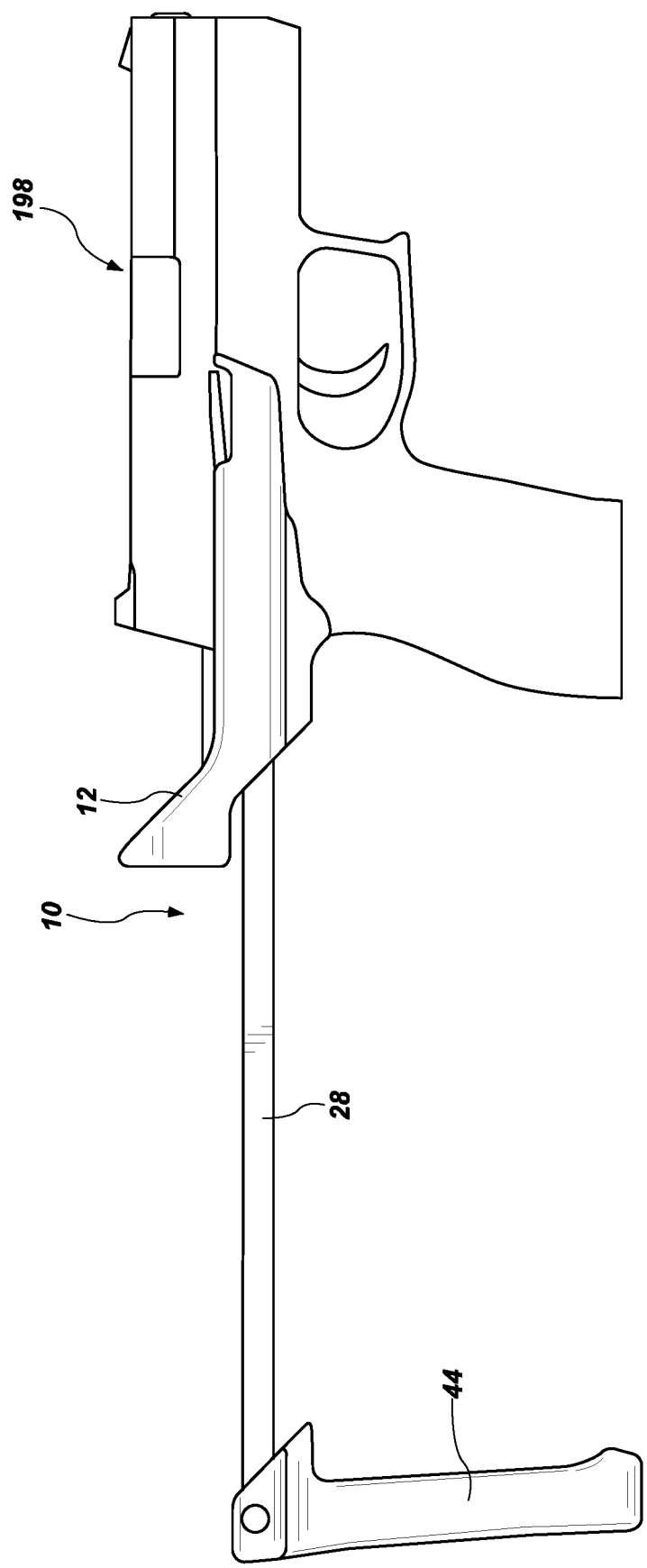
FIG. 19 depicts the brace apparatus shown in FIG. 18, the brace apparatus being shown in a second position

FIG. 7 illustrates the brace apparatus 10 in accordance with this disclosure secured to a firearm 198, specifically a hand gun 200. The firearm or hand gun 200 comprises a barrel 202, a grip 204 positioned at one end of the barrel, a trigger 206 operably connected to a firing mechanism, and a retaining member, or clip 208, for retaining ammunition. The brace apparatus 10 is attached to the pistol with a pin 210 which is positioned through the mounting housing 12 and through the grip 204 of the pistol. It should be noted, as depicted in FIGS. 18 and 19, that the brace apparatus in accordance with this disclosure may be integrally formed as part of the firearm frame.

Figure 8:
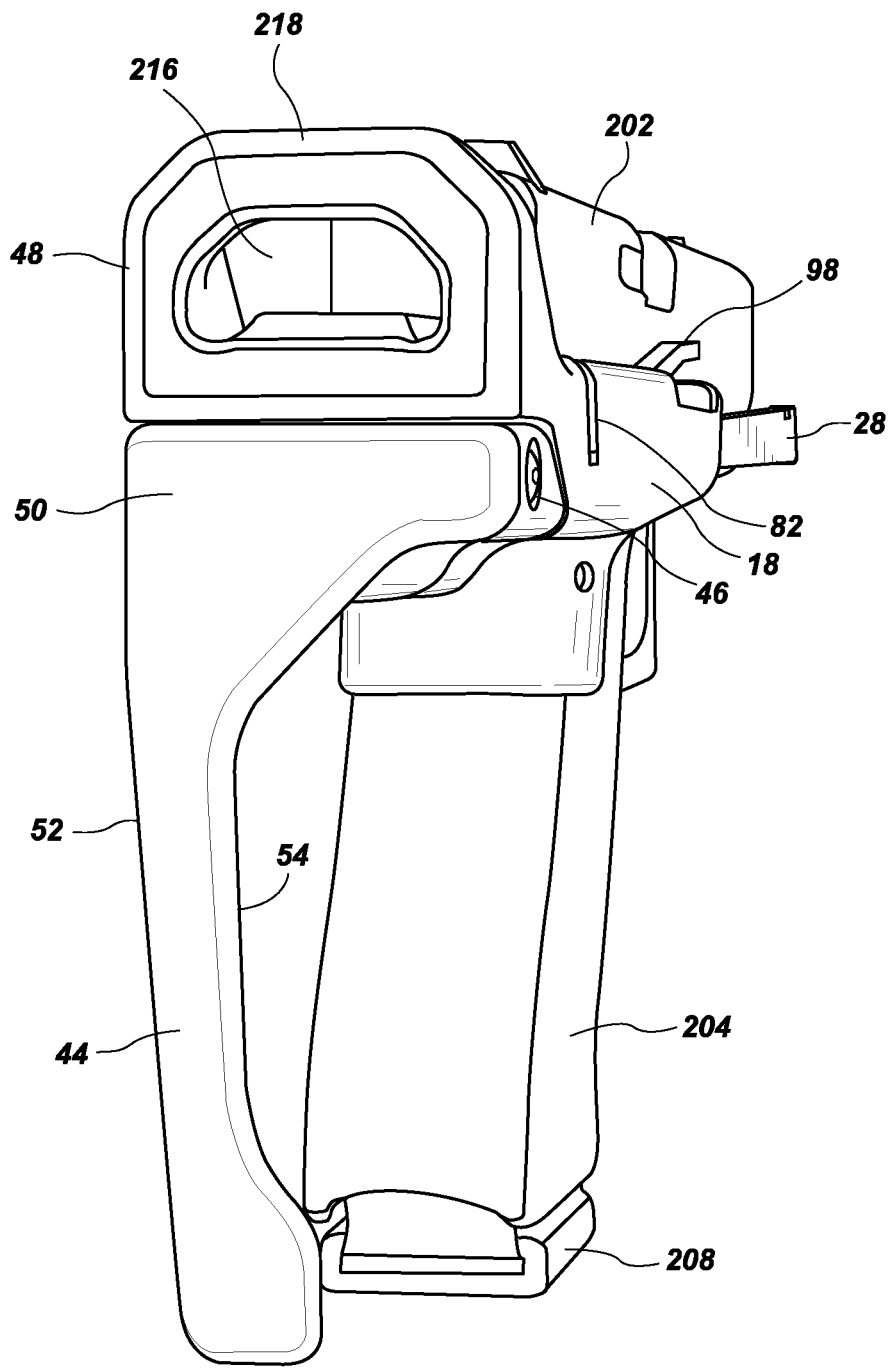
FIG. 8 is a rear view of the brace apparatus when attached to a hand gun.

The brace apparatus 10 is shown, in FIG. 7, in the first position where the brace 44 is positioned in proximity to the grip 204 of the pistol. It can be seen that the rear portion 48 of the mounting housing 12 is positioned at a distance from the barrel 202 of the pistol 200, which allows the slide 212 of the barrel 202 to move rearwardly as the firearm is fired. Additionally, the rear portion 48 of the mounting housing 12 may be formed with an arched portion forming an eye guard 218 with an opening 215. The eye guard 218 is positioned to allow the slide of the pistol 200 to recoil when fired without hitting a user when the user's face is positioned proximate the end of the pistol 200, which may be the case when using the brace as a stock. The eye guard is spaced from the end of the pistol 200 to allow the slide of the pistol 200 to extend back toward the user without hitting the eye guard. Thus, a user may view down the barrel of the pistol 200 while being protected from any rearward movement of the slide. In addition, the eye guard 218 provides a hand grip that a user can use to help force the brace 44 back to the first position until locked. FIG. 8 further illustrates the eye guard 218.

Figure 11:
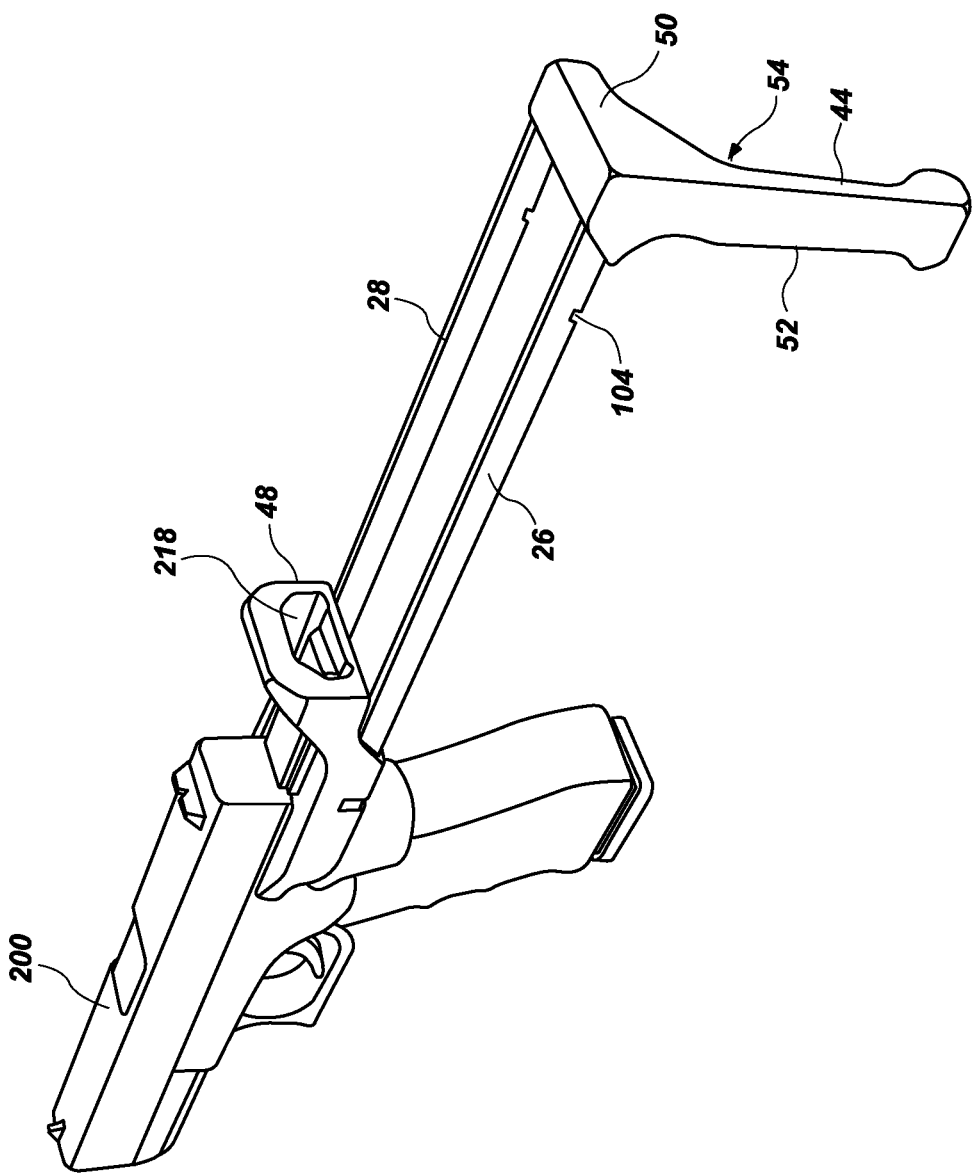
FIG. 11 is a rear perspective view of the brace apparatus secured to a hand gun and being in a second, or deployed, position.
Figure 12:
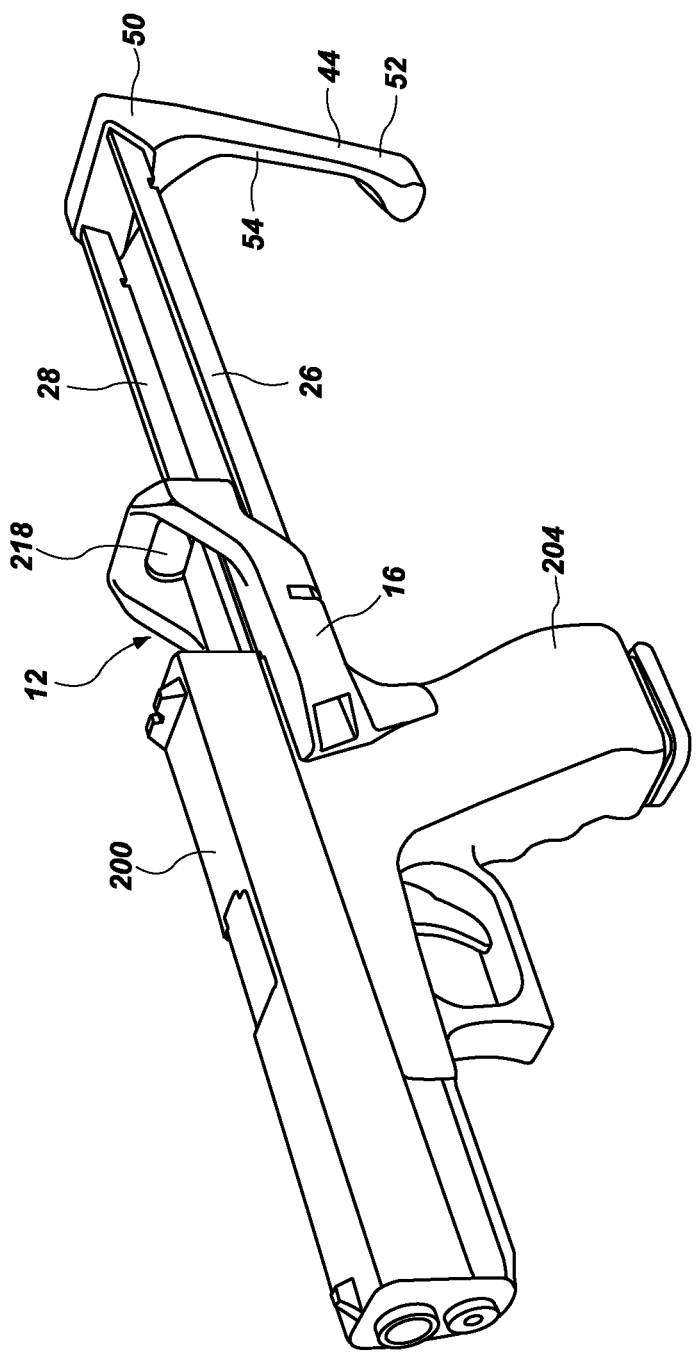
FIG. 12 is a front perspective view of the brace apparatus secured to a hand gun and being in a second, or deployed, position.

FIG. 9 is a further view of the brace apparatus 10 connected to a pistol 200, the brace 44 being in the first position. FIG. 10 illustrates the brace 44 in a deployed, second position where the brace 44 is spaced a distance from the mounting housing 12 and from the pistol 200. FIGS. 11 and 12 provide further perspective views of the brace apparatus 10, relative to the pistol 200, when in the second position.

Figure 13:
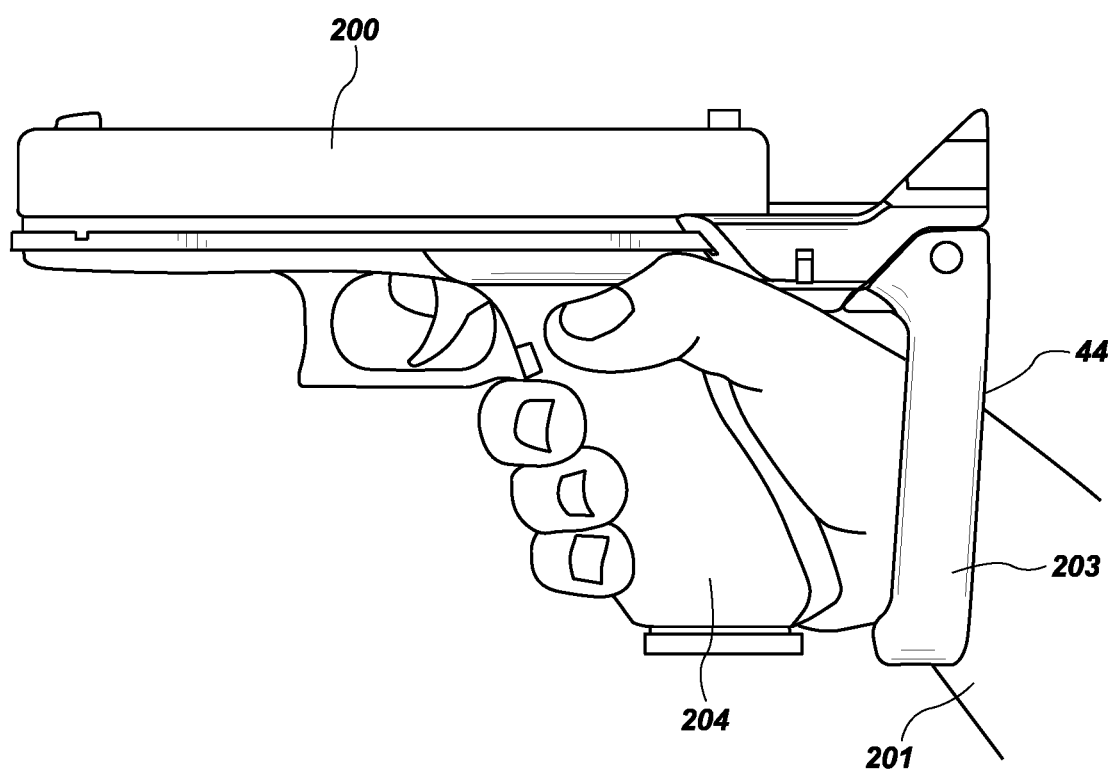
FIG. 13 is a photograph of a user holding the hand gun as the brace apparatus is engaged with the arm of the user in a first position.
Figure 14:
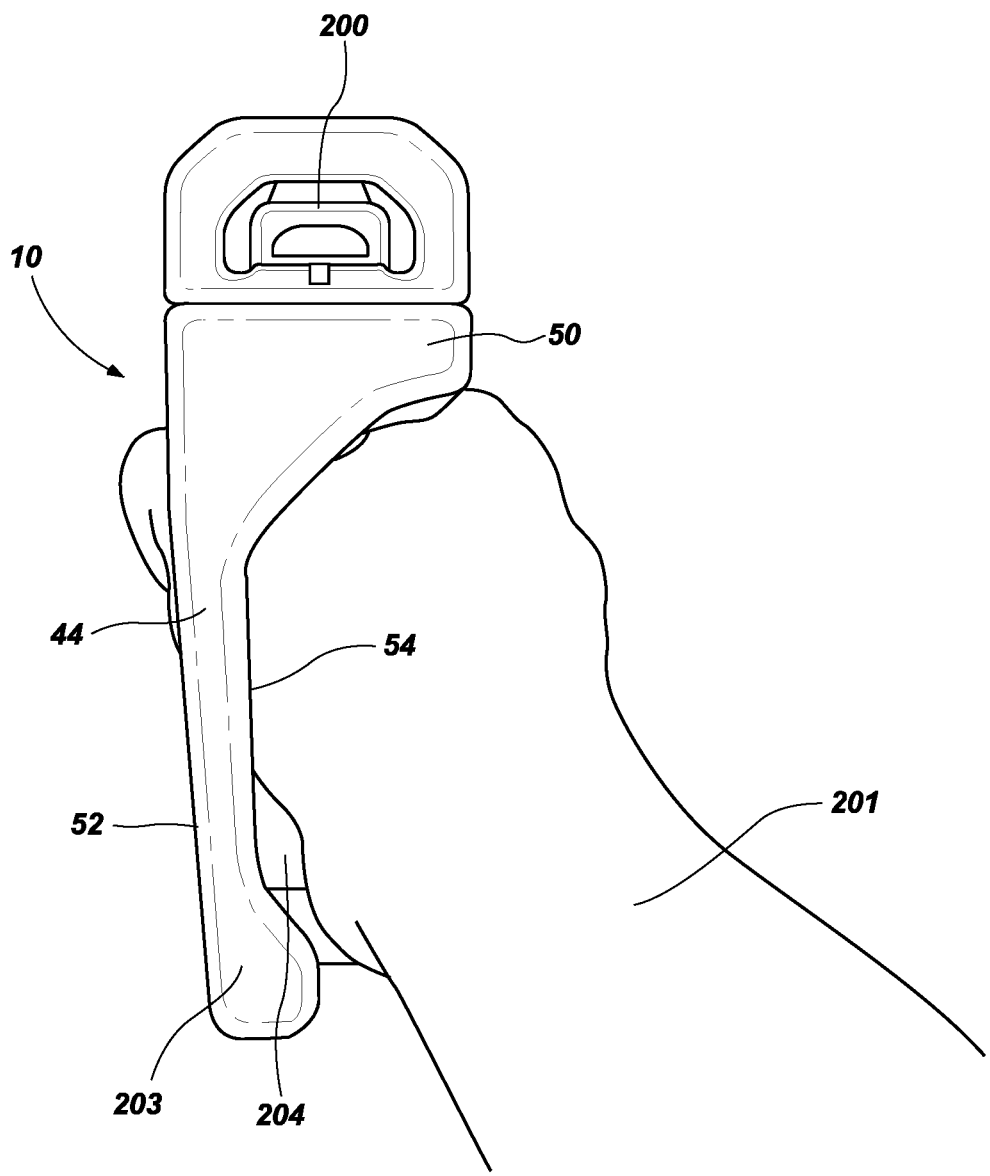
FIG. 14 is a photograph of rear view of the brace apparatus as a user is holding the hand gun, the brace apparatus being in a first, or undeployed, position.

FIGS. 13 and 14 illustrate a user 201 holding the grip 204 of the pistol 200 while the brace 44 is in the first position and resting against the user's thumb pad or wrist. As best seen in FIG. 14, the rear portion 203 of the brace apparatus 10 has a generally L-shaped configuration with the horizontally extending portion 50 extending over the hand of the user and a downwardly extending portion 52 extending along the side of the thumb pad and wrist of the user 201 on the palm side of the user's hand/wrist. Thus, the inner surface 54 of the brace 44 is offset from a longitudinally extending centerline of the pistol 200 and is rearwardly set relative to the grip 204 to allow the hand of the user 201 to grip the pistol and hold the pistol 200 in a normal pistol gripping position without interference from the brace 44.

Figure 15:
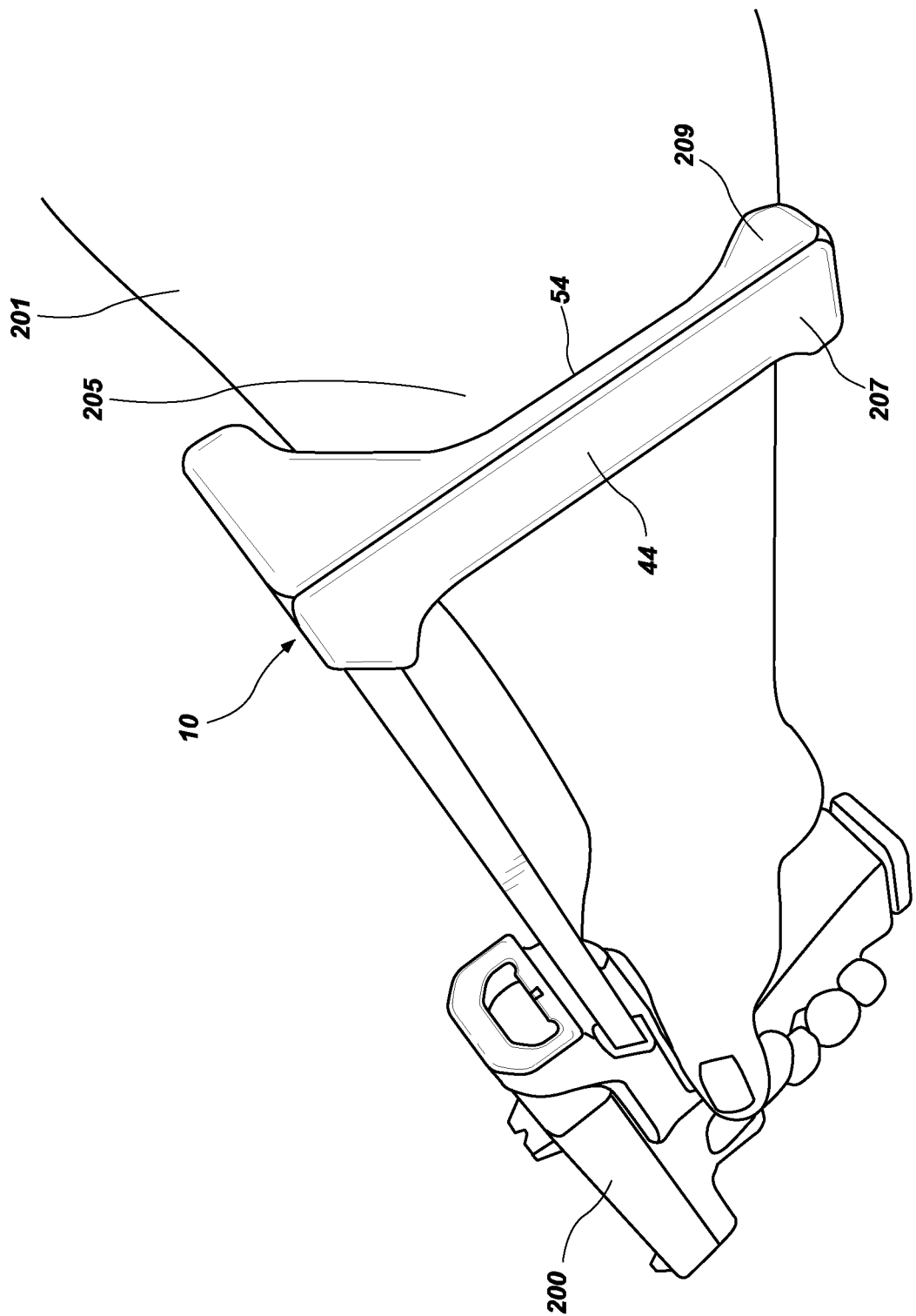
FIG. 15 is a photograph of a user holding the hand gun with the brace apparatus in the second, or deployed, position.

As shown in FIG. 15, the brace apparatus 10 is in a deployed state having been deployed to the second position. In this position, the inner surface 54 of the brace 44 is naturally held against the inner forearm 205 of the user 201. The engagement or contact between the forearm 205 of the user 201 and the inner surface 54 of the brace 44 provides lateral stability of the pistol 200 relative to the forearm 205 of the user 201. The upper horizontally extending portion 50 extends over at least a portion of the forearm 205 of the user 201 and the lower end portion 207 of the downwardly extending portion 54 includes a wider portion 209 that partially extends below the forearm 205 of the user 201 to also provide vertical stability of the brace 44, and thus the pistol 200, relative to the user's forearm 205. Additionally, the brace 44 when fully deployed can be used as a buttstock with the brace 44 placed against the shoulder of the user as the user views down the barrel of the pistol 200. In this position, the eye guard, as previously discussed, prevents the user from placing their face to close to the end of the pistol where they could be struck by the pistol slide when fired.

Figure 20:
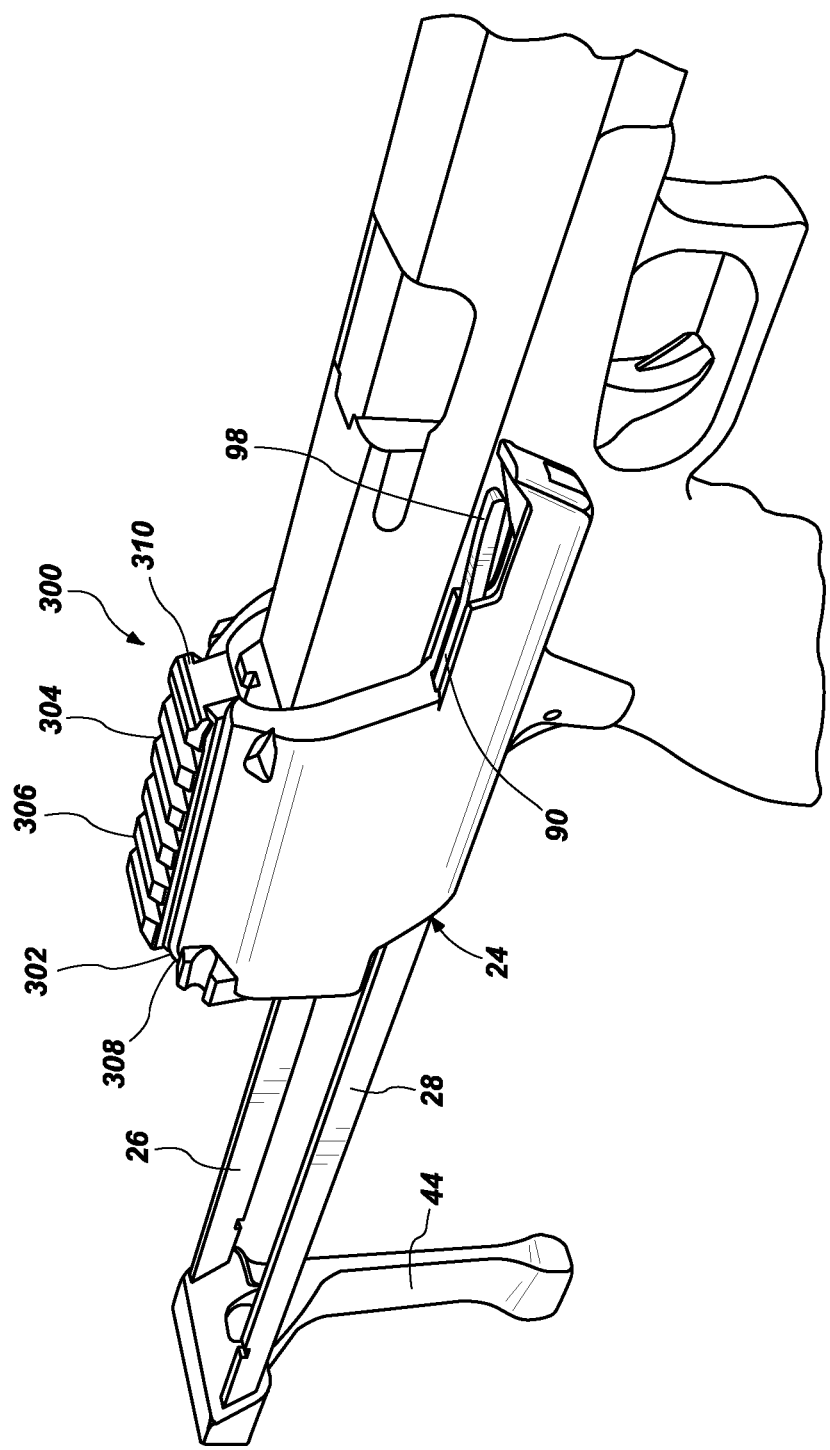
FIG. 20 is a perspective view of an alternative embodiment of the brace apparatus in accordance with this disclosure in which the mounting housing is configured to receive auxiliary devices.
Figure 21:
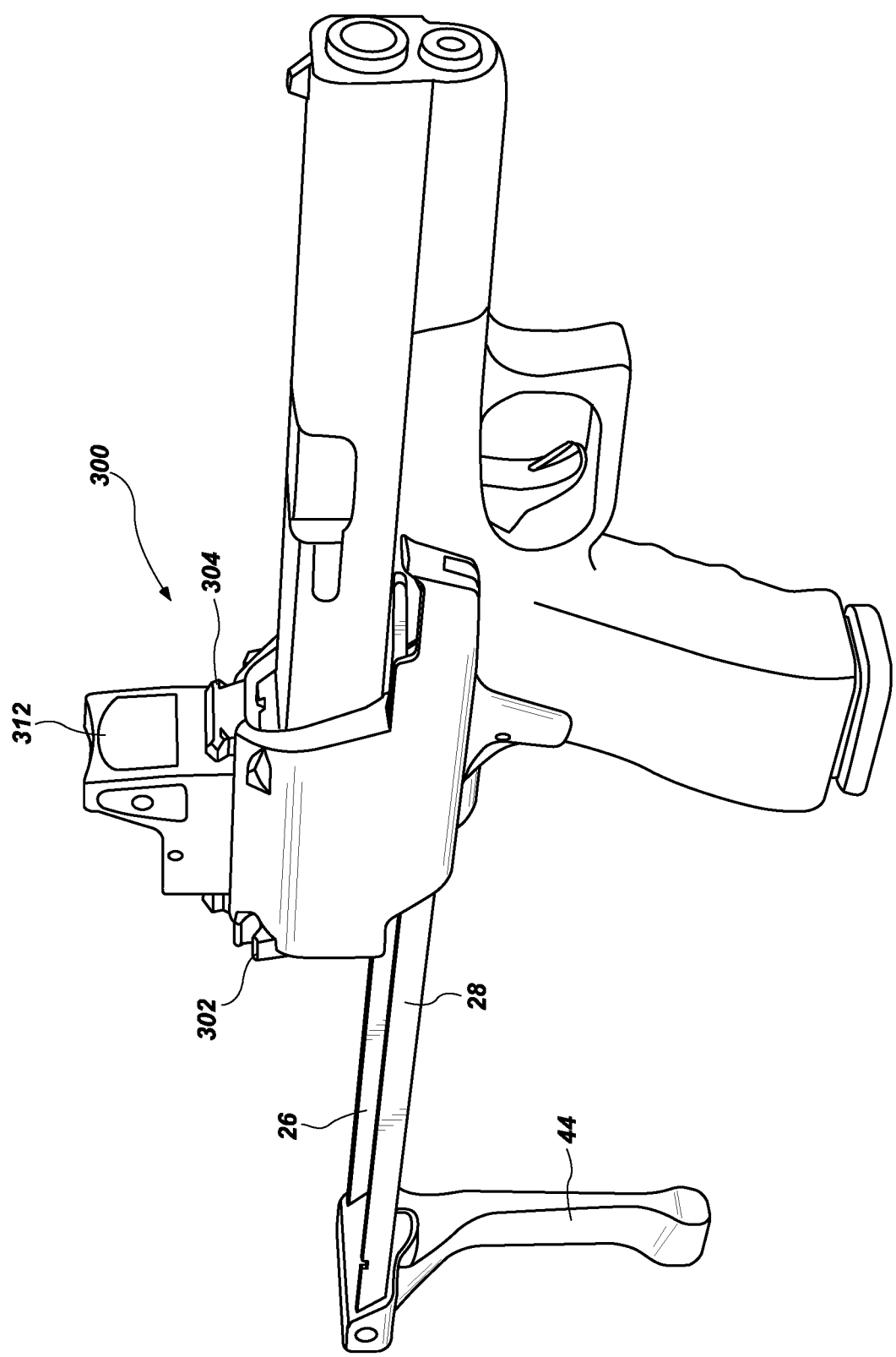
FIG. 21 is a perspective view of the alternative embodiment shown in FIG. 20 with an optic scope attached to the mounting housing.

FIG. 20 depicts an alternative embodiment of the brace apparatus in accordance with this disclosure which like parts are depicted with the same reference numbers. In this embodiment, brace apparatus 300 includes a mounting housing 302 which is configured with an attachment member 304 for enabling the attachment of auxiliary devices. The attachment member 304 may be configured in any suitable manner to accommodate the attachment of auxiliary devices. As depicted in FIG. 20, however, the attachment member 304 is formed as a picatinny rail mount 306 having horizontally extending edges 308, 310 for receiving a device thereon. As shown in FIG. 21, an exemplar device that may be attached to the attachment member 304 is a scope 312. Other devices such as lasers may be useful for attachment also.

One particular advantage of the brace apparatus 10 in accordance with this disclosure is the fact that the brace apparatus 10 can be attached to a hand gun or pistol and does not interfere with the handling of the hand gun when the brace 44 is in the first position. That is, the reduced profile of the brace apparatus allows the hand gun to be holstered without encumbering the fit of the hand gun in the holster or preventing ease of access to the hand gun. This feature is particularly useful in police or military uses. The contact point 98 for actuating the deployment device is positioned at index finger level to the user so that when the gun is removed from the holster, the user can immediately depress the contact point with the index finger and instantaneously deploy the brace apparatus for quick and stabilized shooting. The brace apparatus disclosed herein is illustrated and described with respect to use with hand guns, but is equally adaptable for use with rifles or varying kinds and other armaments, such as grenade launchers.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, inventions have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A firearm brace apparatus for a firearm, comprising:
a mounting housing having an attachment surface to engage a firearm;
a first elongate body slidingly engaged with the mounting housing on a first lateral side thereof, the first elongate body having a first notch in a top surface thereof proximate a first end of thereof and a second notch in a top surface thereof proximate a second end of thereof;
a second elongate body slidingly engaged with the mounting housing on a second lateral side thereof, the second elongate body having a first notch in a bottom surface thereof proximate a first end of thereof and a second notch in a bottom surface thereof proximate a second end of thereof;
a brace connected to and between the pair of elongated bodies at the second ends of the first and second elongate bodies; and
a locking member coupled to the mounting housing positioned between the first and second elongate bodies with a first end extending over the first elongate body and configured to selectively engage with one of the first and second notches of the first elongate body and a second end extending under the second elongate body and configured to selectively engage with one of the first and second notches of the second elongate body;

a deployment device coupled to the mounting housing, the deployment device having a first spring element for forcing the brace from a first position proximate a grip of the firearm to a second position away from the grip of the firearm as the pair of elongate bodies slide relative to the mounting housing; and an actuating member coupled to the locking member, the actuating member having a contact point for engagement by a finger of a user, the contact point positioned above a trigger of a the firearm when attached thereto, the contact point being user engageable by a finger of the user while also gripping a hand grip of the firearm, whereby movement of the actuating member from a first position to a second position causes the locking member to disengage from the first and second elongate bodies to allow them to slide relative to the mounting housing.

2. The firearm brace apparatus of claim 1, wherein the mounting housing defines first and second channels on opposite sides of the mounting housing, each configured for slidedly receiving and one of the first and second elongated bodies.

3. The firearm brace apparatus of claim 2, wherein each of the second ends of the first and second elongated bodies are longitudinally tapered for engaging in a friction fit with a respective one of the first and second channels when the brace is in the second position.

4. The firearm brace apparatus of claim 3, wherein each of the first and second channels are tapered to substantially match the size and shape of the tapered ends of the first and second elongated bodies to form the friction fit therewith.

5. The firearm brace apparatus of claim 1, wherein the first spring element is coupled to the mounting housing and engages with the brace when the brace is in the first position to apply a biasing force to the brace.

6. The firearm brace apparatus of claim 1, wherein the brace is a body biased to one lateral side, adapted for bracing against the user's arm in the second position, and unobstructed access to the grip of the firearm when in the first position.

7. The firearm brace apparatus of claim 1, further comprising a second spring element coupled to the locking member to bias the locking member into a locked position, the actuating member configured to overcome the bias applied by the second spring element when pressed by a user to release the locking member from engagement with the first and second elongated members.

8. The firearm brace apparatus of claim 1, first comprising an eye guard attached to a top of the mounting member, the eye guard positioned a distance from the proximal end of the firearm to prevent any portion of the firearm from striking the user when fired.

9. The firearm brace apparatus of claim 1, further comprising an adjustment member coupled to the spring element to allow for adjustment of a biasing force of the spring element.

10. A firearm part, comprising:
a primary body,
a first elongate body slidingly engaged with the primary body on a first lateral side thereof, the first elongate body having a first notch in a top surface thereof proximate a first end of thereof and a second notch in a top surface thereof proximate a second end of thereof;
a second elongate body slidingly engaged with the primary body on a second lateral side thereof, the second elongate body having a first notch in a bottom surface thereof proximate a first end of thereof and a second notch in a bottom surface thereof proximate a second end of thereof;
a brace connected to and between the pair of elongated bodies at the second ends of the first and second elongate bodies; and
a locking member coupled to the primary body positioned between the first and second elongate bodies with a first end extending over the first elongate body and configured to selectively engage with one of the first and second notches of the first elongate body and a second end extending under the second elongate body and configured to selectively engage with one of the first and second notches of the second elongate body;
a deployment device coupled to the primary body, the deployment device having a first spring element for forcing the brace from a first position proximate a grip of the firearm to a second position away from the grip of the firearm as the pair of elongate bodies slide relative to the primary body; and
an actuating member coupled to the locking member, the actuating member having a contact point for engagement by a finger of a user, the contact point positioned above a trigger of a firearm when attached thereto, the contact point being user engageable by a finger of the user while also gripping a hand grip of the firearm, whereby movement of the actuating member from a first position to a second position causes the locking member to disengage from the first and second elongate bodies to allow them to slide relative to the primary body.

11. The firearm part of claim 10, wherein the primary body defines first and second channels on opposite sides of the primary body, each configured for slidedly receiving and one of the first and second elongated bodies.

12. The firearm part of claim 11, wherein each of the second ends of the first and second elongated bodies are longitudinally tapered for engaging in a friction fit with a respective one of the first and second channels when the brace is in the second position.

13. The firearm part of claim 12, wherein each of the first and second channels are tapered to substantially match the size and shape of the tapered ends of the first and second elongated bodies to form the friction fit therewith.

14. The firearm part of claim 10, wherein the first spring element is coupled to the primary body and engages with the brace when the brace is in the first position to apply a biasing force to the brace.

15. The firearm part of claim 10, wherein the brace is a body biased to one lateral side, adapted for bracing against the user's arm in the second position, and unobstructed access to the grip of the firearm when in the first position.

16. The firearm part of claim 10, further comprising a second spring element coupled to the locking member to bias the locking member into a locked position, the actuating member configured to overcome the bias applied by the second spring element when pressed by a user to release the locking member from engagement with the first and second elongated members.

17. The firearm part of claim 10, first comprising an eye guard attached to a top of the mounting member, the eye guard positioned a distance from the proximal end of the firearm to prevent any portion of the firearm from striking the user when fired.

18. The firearm part of claim 10, further comprising an adjustment member coupled to the spring element to allow for adjustment of a biasing force of the spring element.

\* \* \* \* \*